US012705296B2

(12) United States Patent
Parker

(10) Patent No.: US 12,705,296 B2
(45) Date of Patent: Aug. 11, 2026

(54) AGGREGATED DATA QUERY INTERFACE

(71) Applicant: MX Technologies, Inc., Lehi, UT (US)

(72) Inventor: Don Parker, Cedar Hills, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 453 days.

(21) Appl. No.: 18/362,955

(22) Filed: Jul. 31, 2023

(65) Prior Publication Data

US 2024/0037163 A1 Feb. 1, 2024

Related U.S. Application Data

(60) Provisional application No. 63/393,913, filed on Jul. 31, 2022.

(51) Int. Cl.

| | |
|---|---|
| ***G06F 21/00*** | (2013.01) |
| ***G06F 9/451*** | (2018.01) |
| ***G06F 16/2455*** | (2019.01) |
| ***G06F 16/9538*** | (2019.01) |
| ***G06F 21/62*** | (2013.01) |
| ***H04L 9/40*** | (2022.01) |

(52) U.S. Cl.

CPC .......... *G06F 16/9538* (2019.01); *G06F 9/451* (2018.02); *G06F 16/24556* (2019.01); *G06F 21/6245* (2013.01); *H04L 63/0884* (2013.01)

(58) Field of Classification Search

CPC ................. G06F 16/9538; G06F 9/451; G06F 16/24556; G06F 21/6245; H04L 63/0884

See application file for complete search history.

(56) References Cited

U.S. PATENT DOCUMENTS

| | | | | |
|---|---|---|---|---|
| 6,850,906 | B1 | 2/2005 | Chadha et al. | |
| 7,877,402 | B1 | 1/2011 | Weiss et al. | |
| 8,626,579 | B2 | 1/2014 | Fordyce, III et al. | |
| 9,892,457 | B1 * | 2/2018 | Kapczynski | G06Q 40/03 |
| 10,191,987 | B2 | 1/2019 | Hart et al. | |
| 10,445,332 | B2 | 10/2019 | Indyk et al. | |
| 10,552,843 | B1 | 2/2020 | Podgorny et al. | |
| 10,572,954 | B2 * | 2/2020 | Goodyear | G06Q 40/125 |
| 10,607,247 | B2 | 3/2020 | Winter et al. | |
| 11,409,902 | B1 * | 8/2022 | Fakhraie | H04W 12/37 |
| 2019/0318122 | A1 * | 10/2019 | Hockey | G06F 21/6245 |
| 2025/0372249 | A1 * | 12/2025 | Figgers | G06F 40/20 |

* cited by examiner

*Primary Examiner* — Kendall Dolly
(74) *Attorney, Agent, or Firm* — KNH LLP

(57) ABSTRACT

Apparatuses, systems, methods, and computer program products are disclosed for an aggregated data query interface. A method includes authenticating a user of a publicly accessible query interface. A method includes authenticating the user for a third-party financial account of the user. A method includes accessing financial transaction data from the third-party financial account on behalf of the user. A method includes receiving a query from the user via the publicly accessible query interface. A method includes embedding, in a graphical user interface on an electronic display screen, a display of one or more financial transactions from the financial transaction data from the third-party financial account with a display of query results from the publicly accessible query interface, the one or more financial transactions and the query results each associated with the query from the user.

20 Claims, 9 Drawing Sheets

AGGREGATED DATA QUERY INTERFACE

CROSS-REFERENCES TO RELATED APPLICATIONS

This application claims the benefit of U.S. Provisional Patent Application No. 63/393,913 entitled "AGGREGATED DATA QUERY INTERFACE" and filed on Jul. 31, 2022, for Don Parker, which is incorporated herein by reference in its entirety for all purposes.

FIELD

This invention relates to a user's data and more particularly relates to a query interface for a user's aggregated data.

BACKGROUND

More and more of a user's transactions and other data are being recorded as electronic data, which is often stored remotely (e.g., in the cloud) and secured with unique credentials. Other data may be publicly available, and more easily accessible. It may be difficult or at least less convenient for a user to access their secured personal data when they need it, or from other online locations, making that data less useful.

BRIEF SUMMARY

Apparatuses, systems, methods, and computer program products are disclosed for an aggregated data query interface. In one embodiment, an apparatus includes a processor and a memory that stores code executable by the processor to perform operations. An operation, in one embodiment, includes authenticating a user of a publicly accessible query interface. An operation, in a further embodiment, includes authenticating a user for a third-party financial account of the user. In some embodiments, an operation includes accessing financial transaction data from a third-party financial account on behalf of a user. An operation, in certain embodiments, includes receiving a query from a user via a publicly accessible query interface. In one embodiment, an operation includes embedding, in a graphical user interface on an electronic display screen, a display of one or more financial transactions from financial transaction data from a third-party financial account with a display of query results from a publicly accessible query interface, where the one or more financial transactions and the query results may each be associated with a query from a user.

In some embodiments, a computer program product comprises executable code stored on a non-transitory computer readable storage medium, executable by a processor to perform operations for an aggregated data query interface. An operation, in some embodiments, includes authenticating a user of a publicly accessible query interface. An operation, in one embodiment, includes authenticating a user for a third-party financial account of the user. In certain embodiments, an operation includes accessing financial transaction data from a third-party financial account on behalf of a user. An operation, in a further embodiment, includes receiving a query from a user via a publicly accessible query interface. In some embodiments, an operation includes embedding, in a graphical user interface on an electronic display screen, a display of one or more financial transactions from financial transaction data from a third-party financial account with a display of query results from a publicly accessible query interface, where the one or more financial transactions and the query results may each be associated with a query from a user.

In one embodiment, an apparatus for an aggregated data query interface includes means for authenticating a user of a publicly accessible query interface. An apparatus, in some embodiments, includes means for authenticating a user for a third-party financial account of the user. In a further embodiment, an apparatus includes means for accessing financial transaction data from a third-party financial account on behalf of a user. An apparatus, in one embodiment, includes means for receiving a query from a user via a publicly accessible query interface. In certain embodiments, an apparatus includes embedding, in a graphical user interface on an electronic display screen, a display of one or more financial transactions from financial transaction data from a third-party financial account with a display of query results from a publicly accessible query interface, where the one or more financial transactions and the query results may each be associated with a query from a user.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
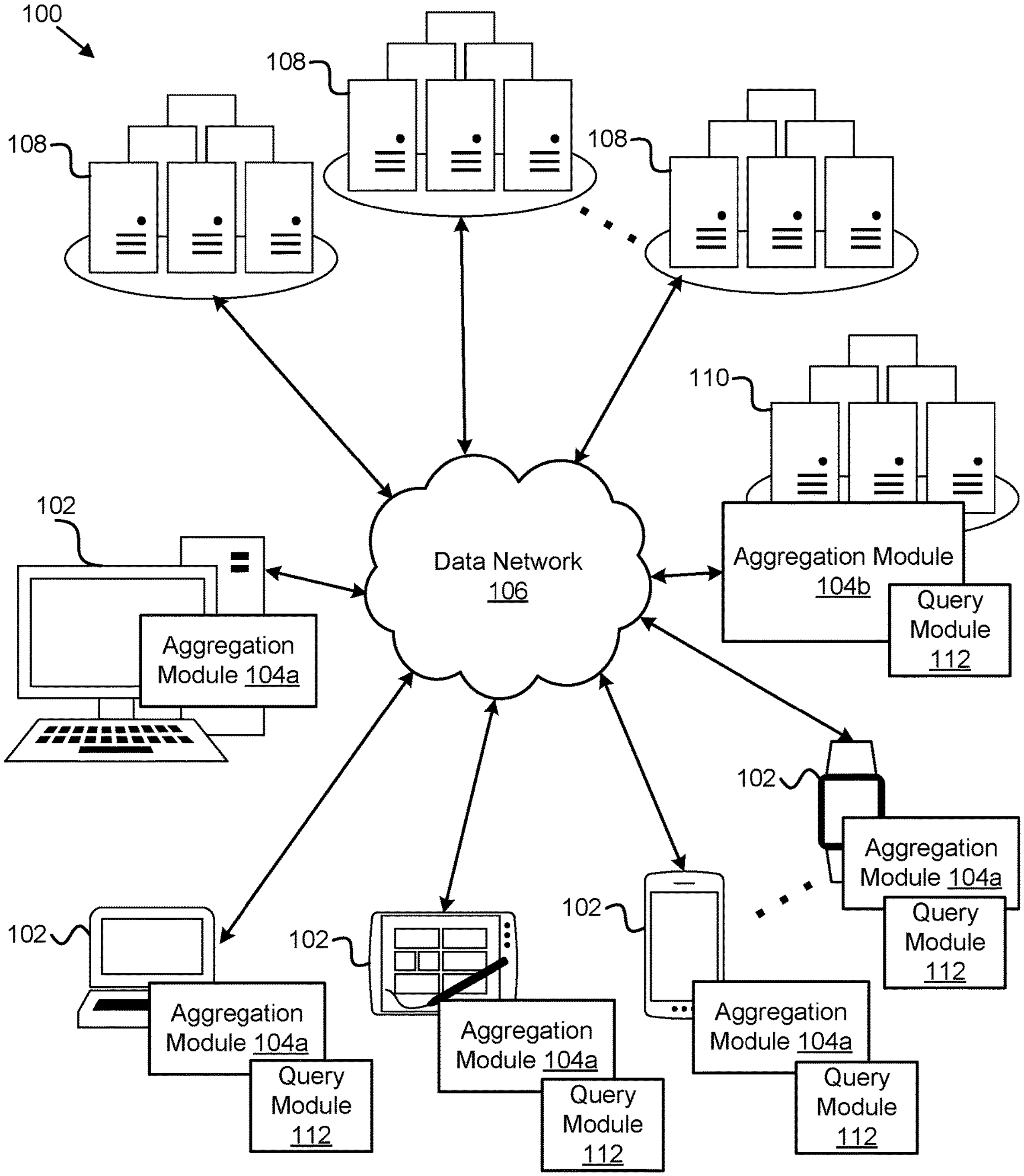
FIG. 1 is a schematic block diagram illustrating one embodiment of a system for an aggregated data query interface.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean “including but not limited to” unless expressly specified otherwise. An enumerated listing of items does not imply that any or all of the items are mutually exclusive and/or mutually inclusive, unless expressly specified otherwise. The terms “a,” “an,” and “the” also refer to “one or more” unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a “circuit,” “module,” or “system.” Furthermore, aspects of the present invention may take the form of a computer program product embodied in one or more computer readable medium(s) having program code embodied thereon.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (“RAM”), a read-only memory (“ROM”), an erasable programmable read-only memory (“EPROM” or Flash memory), a static random access memory (“SRAM”), a portable compact disc read-only memory (“CD-ROM”), a digital versatile disk (“DVD”), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for a query interface. In one embodiment, the system 100 includes one or more hardware devices 102, one or more aggregation modules 104 (e.g., a backend aggregation module 104*b* and/or a plurality of aggregation modules 104*a* disposed on the one or more hardware devices 102) which may comprise one or more query modules 112, one or more data networks 106 or other communication channels, one or more third-party service providers 108 (e.g., one or more servers 108 of one or more service providers 108; one or more cloud or network service providers, or the like), and/or one or more backend servers 110. In certain embodiments, even though a specific number of hardware devices 102, aggregation modules 104, data networks 106, third-party service providers 108, and/or backend servers 110 are depicted in FIG. 1, one of skill in the art will recognize, in light of this disclosure, that any number of hardware devices 102, aggregation modules 104, data networks 106, third-party service providers 108, and/or backend servers 110 may be included in the system 100 for a query interface.

In certain embodiments, either in a distributed and/or decentralized manner from the hardware devices 102, or from a central location such as a backend server 110, an aggregation module 104 may comprise a query module 112 configured to provide a query interface (e.g., from within an internet browser, integrated with a search engine interface, as an artificial intelligence query interface, in a publicly available manner on the internet, to a user, to one or more third-party service providers 108, or the like). For example, a query module 112 may authenticate a user (e.g., within an internet browser, on a hardware device 102 of the user, or the like) and in response to authenticating the user, may integrate and/or embed aggregated data from one or more third-party service providers 108 into an interface for querying and/or accessing other data (e.g., search engine results, publicly available data, internet data, in a response to an artificial intelligence query interface, as training data for an artificial intelligence model, or the like). In certain embodiments, a query module 112 may make aggregated data from one or more third-party service providers 108 searchable and/or otherwise accessible through a search bar and/or another user interface element of an internet search engine website, an internet browser, an artificial intelligence query interface, or the like (e.g., allowing a user to query the user's own aggregated financial transactions, account data, or the like together with other, publicly available data in a secure manner).

A query module 112 may index aggregated user data by one or more features or other data elements, making them searchable (e.g., by merchant or other transaction party, by transaction amount, by account balance, by account name or type, by date, by location, by good or service purchased, or the like). A query module 112, in certain embodiments, may process and/or analyze aggregated user data (e.g., using machine learning or other artificial intelligence) to detect an event, to predict an event, to suggest an action, to provide an insight and/or notification, to respond to a query (e.g., a query regarding personal financial management, a budget, one or more financial transactions, a spending history, a net worth, a merchant, a spending category, and/or another financial subject) or the like to the user in an embedded manner (e.g., within another user interface such as a search engine interface, a URL and/or search box of an internet browser, an artificial intelligence query interface, a social media feed, an email interface, a mobile device interface, an e-commerce website interface, a point of sale interface, or the like). A query module 112, in some embodiments, may provide and/or display a user interface element allowing a user to expand and/or hide aggregated data, selectively making the aggregated data visible and/or searchable in the interface (e.g., a toggle element, a checkbox, an "X" or other "close" element, a minimize/hide element, or the like).

In various embodiments, a query module 112 may display one or more of a user's previous transactions with a merchant or other party to a transaction in response to the user performing an internet search and/or an artificial intelligence query or the like identifying that merchant or other party, may display an account balance to a user in response to the user selecting the account as a payment source for a transaction, may display account and/or transaction data to a user on a search engine homepage or new browser tab page, or the like, in response to authenticating the user and downloading the data from one or more third-party service providers 108, or the like. In this manner, in some embodiments, a query module 112 may allow a user to query and/or otherwise access data from a third-party service provider 108 securely in a different location (e.g., a search engine web page, within an internet browser, using an artificial intelligence query interface, or the like), without having to separately login to and/or use an interface of the third-party service provider 108.

An artificial intelligence query interface of a query module 112, in various embodiments, may comprise a machine learning or other artificial intelligence model (e.g., a large language model, a linear regression, a logistic regression, a linear discriminant analysis, a decision tree, a naive Bayes model, a K-nearest neighbors model, learning vector quantization, support vector machines, a random forest, a deep neural network, and/or another model) configured to receive a query (e.g., a natural language question, command, and/or other prompt) and to provide a response. In certain embodiments, a query module 112 may base a response to a query received by an artificial intelligence query interface on financial transaction data received from a third-party service provider 108 on behalf of a user (e.g., the query module 112 may make personal financial transaction data of a user available to a machine learning or other artificial intelligence model thereby enabling the artificial intelligence query interface to respond to the user with a personal, customized response based on the user's own personal finances and/or financial transactions, or the like). In this manner, in some embodiments, a query module 112 and/or an associated artificial intelligence query interface may intelligently assist a user in their personal financial management, budgeting, goal setting, tax return preparation, credit/loan and/or other financial applications, or the like in an accurate and customized manner, unique to the individual user.

In one embodiment, the system 100 includes one or more hardware devices 102. The hardware devices 102 (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware devices 102 are in communication with one or more servers 108 of one or more third-party service providers 108 and/or one or more backend servers 110 via a data network 106, described below. The hardware devices 102, in a further embodiment, are capable of executing various programs, program code, applications, instructions, functions, or the like.

In one embodiment, an aggregation module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more third-party service providers 108 (e.g., for a third-party financial account of a user, or the like) and/or for a publicly accessible query interface of the query module 112 (e.g., a search engine, an artificial intelligence query interface, or the like). The aggregation module 104, in certain embodiments, accesses a server 108 of a third-party service provider 108 using a user's electronic credentials to download data associated with the user from the server 108, such as a user's photos, a user's social media posts, a user's medical records, a user's financial transaction records or other financial data, and/or other data associated with and/or owned by a user but stored by a server 108 of a third-party service provider 108 (e.g., stored by hardware not owned, maintained, and/or controlled by the user). The aggregation module 104, in various embodiments, may provide the downloaded data to the user locally (e.g., displaying the data on an electronic display of a hardware device 102); may provide the downloaded data from the hardware device 102 of the user to and/or package the data for a remote server 110 (e.g., a backend aggregation module **104*b*) or other remote device (e.g., another hardware device 102 of the user, a hardware device 102 of a different user, or the like) which may be unaffiliated with the third-party service provider 108; may provide one or more alerts, messages, advertisements, or other communications to the user (e.g., on a hardware device 102) based on the downloaded data; may provide the data to a query module 112** (e.g., to a search engine, to an artificial intelligence query interface, or the like); or the like on behalf of the user and with the user's consent and permission.

In certain embodiments, the system 100 includes a plurality of aggregation modules 104 disposed/located on hardware devices 102 of a plurality of different users (e.g., comprising hardware of and/or executable code running on one or more hardware devices 102). The plurality of aggregation modules 104 may act as a distributed and/or decentralized system 100, executing across multiple hardware devices 102, which are geographically dispersed and using different IP addresses, each downloading and/or aggregating data (e.g., photos, social media posts, medical records, financial transaction records, other financial data, and/or other user data) separately, in a distributed and/or decentralized manner. In other embodiments, the system 100 may include a single aggregation module 104, a frontend aggregation module **104*a* and a backend aggregation module 104*b***, or the like.

In one embodiment, a hardware device 102 may include and/or execute an internet browser, which a user may use to access a server 108 of a third-party service provider 108 (e.g., by loading a webpage of the third-party service provider 108 in the internet browser). At least a portion of an aggregation module 104, in certain embodiments, may comprise a plugin to and/or an extension of an internet browser of a user's personal hardware device 102, or the like. For example, the aggregation module 104 may use the same cookies, IP address, saved credentials, or the like as a user would when accessing a server 108 of a third-party service provider 108 through the internet browser. In certain embodiments, the aggregation module 104 may support integration with multiple different types of internet browsers (e.g., on different hardware devices 102).

In one embodiment, at least a portion of an aggregation module 104 may be integrated with or otherwise part of another application executing on a hardware device 102, such as an internet browser, a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a search engine and/or an executable application associated with a search engine, an artificial intelligence query interface and/or an executable application associated with an artificial intelligence query interface, a photo viewer, a medical application, an insurance application, an accounting application, a social media application, or the like, which may use data the aggregation module 104 downloads from a server 108 of a third-party service provider 108.

In one embodiment, the aggregation modules 104*a* comprise a distributed system 100, with the aggregation modules 104*a* and/or the associated hardware devices 102 downloading and/or aggregating data substantially independently (e.g., downloading data concurrently or non-concurrently, without a global clock, with independent success and/or failure of components). Distributed aggregation modules 104*a* may pass messages to each other and/or to a backend aggregation module 104*b*, to coordinate their distributed aggregation of data for users. In one embodiment, the aggregation modules 104*a* are decentralized (e.g., hardware devices 102 associated with users perform one or more aggregation functions such as downloading data), rather than relying exclusively on a centralized server or other device to perform one or more aggregation functions.

In a distributed and/or decentralized system 100, a central entity, such as a backend aggregation module 104*b* and/or a backend server 110, in certain embodiments, may still provide, to one or more aggregation modules 104*a*, one or more messages comprising instructions for accessing a server 108 of a third-party service provider 108 using a user's credentials, or the like. For example, a backend aggregation module 104*b* may provide one or more aggregation modules 104*a* of one or more hardware devices 102 with one or more sets of instructions for accessing a server 108 of a third-party service 108, such as a location for entering a user's electronic credentials (e.g., a text box, a field, a label, a coordinate, or the like), an instruction for submitting a user's electronic credentials (e.g., a button to press, a link to click, or the like), one or more locations of data associated with a user (e.g., a row in a table or chart, a column in a table or chart, a uniform resource locator (URL) or other address, a coordinate, a label, or the like), and/or other instructions or information, using which the aggregation modules 104*a* may access and download a user's data.

In a further embodiment, one or more aggregation modules 104*a* may pass messages to each other, such as instructions for accessing a server 108 of a third-party service provider 108 using a user's credentials, or the like, in a peer-to-peer manner. In another embodiment, a central entity, such as a backend aggregation module 104*b*, may initially seed one or more sets of instructions for accessing a server 108 of a third-party service provider 108 using a user's credentials to one or more aggregation modules 104*a*, and the one or more aggregation modules 104*a* may send the one or more sets of instructions to other aggregation modules 104*a*.

The one or more aggregation modules 104, in certain embodiments, may provide an interface (e.g., a search engine interface, a graphical user interface (GUI), an artificial intelligence query interface, an application programming interface (API), a command line interface (CLI), or the like), such as a query module 112, to provide downloaded and/or aggregated user data from servers 108 of one or more third-party service providers 108 to a user and/or one or more other entities (e.g., a remote server 110 or other hardware device 102 unaffiliated with the third-party service provider 108, a backend aggregation module 104*b*, or the like). The interface, in one embodiment, may comprise a private interface between aggregation modules 104*a* of users' hardware devices 102 and one or more backend aggregation modules 104*b*. For example, this may enable a backend aggregation module 104*b* to provide a user with access to downloaded and/or aggregated user data at multiple locations, on multiple hardware devices 102, through multiple channels, within an internet browser, integrated in a search engine interface and/or an artificial intelligence query interface, or the like. In another embodiment, the interface comprises a public and/or open interface, which may be secured, allowing a user to share the user's downloaded data from an aggregation module 104 to one or more other tools, services, and/or other entities to store, process, and/or otherwise use the data in a secure, privacy-aware manner.

In various embodiments, an aggregation module 104 may be embodied as hardware, software, or some combination of hardware and software. In one embodiment, an aggregation module 104 may comprise executable program code stored on a non-transitory computer readable storage medium for execution on a processor of a hardware device 102, a backend server 110, or the like. For example, an aggregation module 104 may be embodied as executable program code executing on one or more of a hardware device 102, a backend server 110, a combination of one or more of the foregoing, or the like. In such an embodiment, the various modules that perform the operations of an aggregation module 104, as described below, may be located on a hardware device 102, a backend server 110, a combination of the two, or the like.

In various embodiments, an aggregation module 104 may be embodied as a hardware appliance that can be installed or deployed on a backend server 110, on a user's hardware device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware device 102. In certain embodiments, an aggregation module 104 may comprise a hardware device such as a secure hardware dongle or other hardware appliance device (e.g., a set-top box, a network appliance, or the like) that attaches to another hardware device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of an aggregation module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to an aggregation module 104.

An aggregation module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, an aggregation module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of an aggregation module 104.

The semiconductor integrated circuit device or other hardware appliance of an aggregation module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of an aggregation module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more third-party service providers 108, in one embodiment, may include one or more network accessible computing systems such as one or more web servers hosting one or more web sites, an enterprise intranet system, an application server, an application programming interface (API) server, an authentication server, or the like. The one or more third-party service providers 108 may include systems related to various institutions or organizations. For example, a third-party service provider 108 may include a system providing electronic access to a financial institution, a university, a government agency, a utility company, an email provider, a social media site, a photo sharing site, a video sharing site, a data storage site, a medical provider, or another entity that stores data associated with a user. A third-party service provider 108 may allow users to create user accounts to upload, view, create, and/or modify data associated with the user. Accordingly, a third-party service provider 108 may include an authorization system, such as a login element or page of a web site, application, or similar front-end, where a user can provide credentials, such as a username/password combination, to access the user's data.

In one embodiment, the one or more backend servers 110 and/or one or more backend aggregation modules **104*b* provide central management of the networked swarm of aggregation modules 104*a*. For example, the one or more backend aggregation modules 104*b* and/or a backend server 110 may store downloaded user data from the aggregation modules 104*a* centrally, may provide instructions for the aggregation modules 104*a* to access user data from one or more third-party service providers 108 using user credentials, or the like. A backend server 110 may include one or more servers located remotely from the hardware devices 102 and/or the one or more third-party service providers 108. A backend server 110 may include at least a portion of the modules or sub-modules described below with regard to the aggregation modules 104 of FIG. 2, FIG. 3, and/or FIG. 4, may comprise hardware of an aggregation module 104, may store executable program code of an aggregation module 104 in one or more non-transitory computer readable storage media, and/or may otherwise perform one or more of the various operations of an aggregation module 104** described herein in order to aggregate user data from one or more third-party service providers in a distributed manner.

Figure 2:
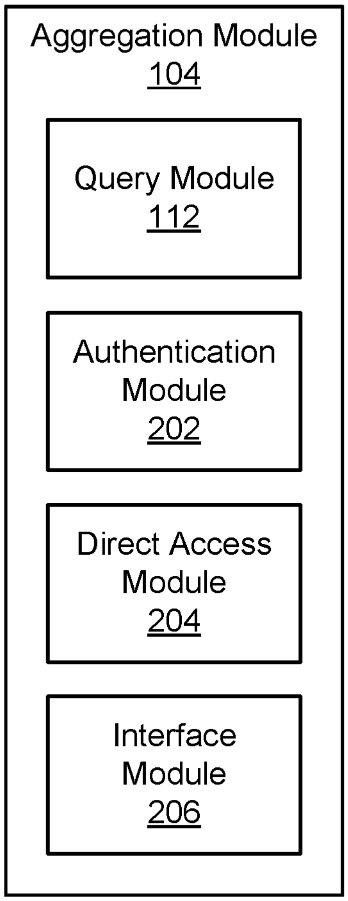
FIG. 2 is a schematic block diagram of one embodiment of an aggregation module.

FIG. 2 depicts one embodiment of an aggregation module 104. In the depicted embodiment, the aggregation module 104 includes a query module 112, an authentication module 202, a direct access module 204, and an interface module 206.

In one embodiment, the authentication module 202 receives a user's electronic credentials for a third-party service provider 108 and/or for a query interface from the user on a hardware device 102 of the user. In cooperation with one or more authentication modules 202, the aggregation modules **104*a*, 104*b***, in certain embodiments, may communicate with each other using a secure and/or encrypted protocol, and/or may store electronic credentials in a secure and/or encrypted manner, so that a user may not see and/or access another user's electronic credentials, downloaded data, or other private and/or sensitive data.

In embodiments where an aggregation module 104 comprises hardware (e.g., a semiconductor integrated circuit device such as an FPGA, an ASIC, or the like), the authentication module 202 may comprise dedicated security hardware for storing and/or processing electronic credentials, downloaded data, and/or other sensitive and/or private data, such as a secure cryptoprocessor (e.g., a dedicated computer on a chip or microprocessor embedded in a packaging with one or more physical security measures) which does not output decrypted data to an unsecure bus or storage, which stores cryptographic keys, a secure storage device; a trusted platform module (TPM) such as a TPM chip and/or TPM security device; a secure boot ROM or other type of ROM; an authentication chip; or the like. In another embodiment, the authentication module 202 may store and/or process electronic credentials, downloaded data, and/or other sensitive data in a secure and/or encrypted way using software and/or hardware of a user's existing hardware device 102 (e.g., encrypting data in RAM, NAND, and/or other general purpose storage) with or without dedicated security hardware.

In one embodiment, as described above, electronic credentials may comprise one or more of a username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or other information whereby the authentication module 202 may authenticate and/or validate an identity of and/or an authorization of a user.

The authentication module 202, in certain embodiments, may receive different credentials from a user for different accounts of the user with different third-party service providers 108 (e.g., different social networks, different photo sharing sites, different financial institutions) and/or query interfaces (e.g., search engines, artificial intelligence query interfaces, or the like) so that the aggregation module 104 may download, aggregate, and/or combine the user's data from the multiple different third-party service providers 108. In one embodiment, as described below with regard to the password manager module 306 of FIG. 3, the authentication module 202, instead of and/or in addition to receiving one or more passwords or other electronic credentials from a user, may manage and/or determine one or more passwords or other electronic credentials for a user for one or more third-party service providers 108.

For example, in certain embodiments, the authentication module 202 may receive an initial set of electronic credentials (e.g., a username and a password) from a user for an account of the user with a third-party service provider 108 and/or for a query interface, and the authentication module 202 may use the initial set of electronic credentials to access the user's account with the third-party service provider 108 and/or the query interface to set a new password, determined by the authentication module 202. The authentication module 202, in one embodiment, may determine passwords or other electronic credentials that are more secure than those typically created by and/or memorable to a user (e.g., longer, more numbers, greater variation between capital and lowercase letters, more frequently changed, or the like).

In one embodiment, the direct access module 204 accesses one or more servers 108 of one or more third-party service providers 108, from a hardware device 102 of a user and/or from a backend server 110, using a user's electronic credentials from the authentication module 202. The direct access module 204, in certain embodiments, downloads data associated with a user (e.g., a user's social media posts, a user's photos, a user's financial transactions, or the like) from one or more servers 108 of one or more third-party service providers 108 to a hardware device 102 of a user and/or to a backend server 110 associated with the direct access module 204, instead of or in addition to downloading the data directly to a hardware device 102 of the user.

The direct access module 204, in certain embodiments, may use a token-based API of a server 108 of a third-party service provider 108 to access the data of the user. The direct access module 204, in a further embodiment, may use a webpage interface of a server 108 of a third-party service provider 108 to access the server 108 using a user's electronic credentials and/or to download data associated with the user (e.g., if an API is not available, or the like). For example, in certain embodiments, the direct access module 204 may download/load a webpage from a server 108 of a third-party service provider 108, enter a username and password or other electronic credentials for a user into textboxes in a form on the webpage, submit the username and password or other electronic credentials using a submit button or other interface element of the webpage, and/or otherwise submit electronic credentials using a website to gain authorized access to data on the server 108 associated with the user. As described below, the pattern module 308 may receive and/or provide instructions enabling the direct access module 204 to access a server 108 (e.g., a location or method for submitting electronic credentials, or the like).

In response to successfully authenticating with and accessing a server 108 of a third-party service provider 108 with a user's electronic credentials, the direct access module 204 may download data associated with the user (e.g., from a user's account or the like) from the server 108, to a hardware device 102 associated with the user, to a backend server 110, or the like. As described below, in certain embodiments, the pattern module 308 may receive and/or provide instructions enabling the direct access module 204 to download data associated with a user from a server 108 of a third-party service provider 108 (e.g., a URL or other link to a location for the data, a label or other identifier for locating the data within one or more webpages or other data structures, or the like). The direct access module 204, in certain embodiments, may follow instructions from a pattern module 308 to authenticate and/or access data from one or more webpages from a server 108 in a screen scraping manner, parsing one or more webpages to locate an entry location and/or submit electronic credentials; to locate, download, and/or extract data associated with a user; or the like (e.g., if an API is not available, or the like).

In one embodiment, the direct access module 204 sends or otherwise submits electronic credentials and/or receives or otherwise downloads data using an API or other access protocol of a server 108 of a third-party service provider 108. For example, the direct access module 204 may send a request in a format specified by and/or compatible with a server 108 (e.g., an API server 108) of a third-party service provider 108. The sent request may comprise electronic credentials for a user or a portion thereof (e.g., a token, a username and/or a password, or the like), a subsequent request may comprise electronic credentials for a user or a portion thereof (e.g., in response to receiving an acknowledgment from the server 108 for the first request, or the like), and/or the direct access module 204 may use a different access protocol of a server 108.

In response to a request for data from the direct access module 204 (e.g., in response to the direct access module 204 authenticating a user using an access protocol of a server 108), a server 108 of a third-party service provider 108 may send and/or return data associated with a user (e.g., in one or more messages, packets, payloads, as a URL or other pointer to a location from where the direct access module 204 may retrieve the data, or the like). The direct access module 204, in various embodiments, may receive data associated with a user directly from a server 108 of a third-party service provider 108 over a data network 106; may receive a pointer, URL or other link to a location of data associated with a user from a server 108 of a third-party service provider 108; may receive data associated with a user from another entity on a data network 106 (e.g., in response to a request from the server 108 of the third-party service provider 108 to the other entity or the like); or may otherwise receive data associated with a user according to an access protocol of a third-party service provider 108.

In one embodiment, a third-party service provider 108 provides a direct access module 204 with an API or other access protocol. In a further embodiment, a direct access module 204 may act as a wrapper for and/or a plugin or extension of, an application of a third-party service provider 108 (e.g., a mobile application), and the application may have access to an API or other access protocol of the third-party service provider 108. In another embodiment, a direct access module 204 may be configured to use an API or other access protocol in a same manner as an application of a third-party service provider 108 (e.g., a mobile application), through observation of the application of the third-party service provider 108 or the like. In certain embodiments, a direct access module 204 may cooperate with an application of a third-party service provider 108, a web browser through which a user accesses services of a third-party service provider 108, or the like to access data associated with a user (e.g., accessing data already downloaded by an application and/or user, accessing a database or other data store of an application and/or web browser, scanning and/or screen scraping a web page of a third-party service provider 108 as a user accesses the web page, or the like).

The direct access module 204, in certain embodiments, may access different third-party service providers 108 in different manners. For example, a first third-party service provider 108 may grant the direct access module 204 with access to an API or other access protocol, while the direct access module 204 may use a web page interface (e.g., screen scraping) to access and download data from a second third-party service provider 108, or the like. In one embodiment, a remote backend server 110 may be associated with a first party service provider 110 (e.g., a vendor and/or provider of an aggregation module 104) and the direct access module 204 may download data associated with a user from both the first party service provider 110 and from one or more third-party service providers 108, aggregating the data together so that the user may access the data in a single interface and/or application (e.g., embedded within the same query interface, or the like). For example, as described below with regard to the interface module 206, the interface module 206 may embed financial transaction data from multiple accounts in results/responses of the same query interface, may provide a user access to the user's photos from multiple third-party cloud storage providers 108 within a single photo application, may provide a user with access to the user's personal financial information within a single personal financial management application and/or online banking application, may provide a user with access to posts from multiple social networks within a single social networking application, or the like.

The direct access module 204, in certain embodiments, may store downloaded and/or aggregated data independently from the one or more third-party service providers 108. For example, the direct access module 204 may store a user's downloaded and/or aggregated data on a hardware device 102 of the user, on a backend server 110 accessible by the user, or the like. In this manner, in certain embodiments, a user may control and/or access the user's data, even if a third-party service provider 108 closes down or is not available, may use the user's data in any manner desired by the user even if the use is not supported by a third-party service provider 108, or the like.

The direct access module 204, in one embodiment, in addition to and/or instead of downloading data from one or more third-party service providers 108, may upload data to and/or change one or more settings of one or more third-party service providers 108, in response to user input or the like. For example, in embodiments where the data comprises photos, the direct access module 204 may upload a photo from a hardware device 102 of the user to one or more third-party service providers 110 (e.g., a downloaded photo that the user has edited on the hardware device 102 or the like). In embodiments where the data comprises social media posts or other content, the direct access module 204 may receive input from a user (e.g., a photo, a textual post, one or more emoji, a video, a document or other file, or the like) and upload the received input to one or more third-party service providers 108 (e.g., social media sites or the like). In embodiments where the data comprises financial transactions or other financial data, the direct access module 204 may schedule a bill pay or other payment or funds transfer, remotely deposit a check (e.g., by uploading photos of the front and/or back of the check, or the like), and/or perform another action.

The direct access module 204 may update or change a user's account information with a third-party service provider 108, such as an account type or plan, credit card or other payment information associated with an account, a phone number or address or other contact information associated with an account, a password or other electronic credentials for an account, and/or other account information of a user for a third-party service provider 108. The direct access module 204 may update and/or upload data in a substantially similar manner to that described herein for downloading data (e.g., determining a user's electronic credentials for a third-party service provider 108, accessing a server 108 of the third-party service provider 108, uploading and/or providing data to the third-party service provider 108, or the like).

In one embodiment, the interface module 206 provides a user's data downloaded by the direct access module 204, from a hardware device 102 of a user to another entity, such as a query module 112 associated with a search engine, artificial intelligence query interface, and/or another query interface; a remote server 110 or other remote device 102 unaffiliated with (e.g., not owned by, operated by, controlled by, or the like) the third-party service provider 108 from which the data was downloaded; or the like. For example, the interface module 206 may provide an API or other interface to provide a user's downloaded and/or aggregated data to a query module 112, a query interface, a hardware device 102 of the user, to a backend aggregation module 104*b*, to a backend server 110, to a different third-party service provider 108, to a different/second hardware device 102 of the user, or the like.

In certain embodiments, the interface module 206 provides a graphical user interface (GUI) on a hardware device 102 of a user, and provides downloaded data associated with the user to the user through the GUI (e.g., embedded with query results, allowing the user to view the data directly, providing one or more notifications and/or recommendations to the user based on the data, providing one or more tables or charts to the user based on the data, providing a summary of or one or more statistics related to the data, or the like). The interface module 206, in various embodiments, may provide a GUI to the user from the same hardware device 102 to which the data was downloaded, on a different hardware device 102 than the hardware device 102, 110 to which the data was downloaded, or the like.

For example, in one embodiment, where the data associated with a user comprises photos, the interface module 206 may provide a photo management interface, a photo editing interface, or the like wherein the user may view and/or otherwise access the user's downloaded and/or aggregated photos. In a further embodiment, where the data associated with a user comprises the user's financial transaction history (e.g., purchases and/or other financial transactions downloaded from one or more financial institutions 108 such as banks, credit unions, lenders, or the like), the interface module 206 may provide a query interface, a personal financial management interface, with a list of transactions, one or more budgets, one or more financial goals, a debt management interface, a net worth interface, and/or another personal financial management interface wherein the user may view the user's downloaded and/or aggregated financial transaction history, and/or alerts or recommendations based thereon. In another embodiment, where the data associated with a user comprises social media posts, the interface module 206 may provide a GUI comprising a stream, feed, and/or wall of social media posts for the user to view (e.g., downloaded and/or aggregated social media posts from multiple social networks 108, from different contacts or friends of the user, or the like).

The interface module 206, in certain embodiments, may provide one or more access controls to a user, allowing the user to define which devices 102, users, third-party service providers 110, or the like may access which data. For example, the interface module 206 may provide an interface for a user to allow and/or restrict certain mobile applications, certain APIs for third-party services, certain plugins or extensions, certain users, certain hardware devices 102, and/or one or more other entities to access data downloaded for the user from one or more third-party service providers 108 (e.g., with access controls by third-party service provider 108 or other data source, by data type, by entity requesting access, and/or at another granularity). In this manner, the aggregation module 104, in certain embodiments, may comprise a local repository of aggregated data, which one or more other devices 102 and/or services may access and use, with a user's permission.

Figure 3:
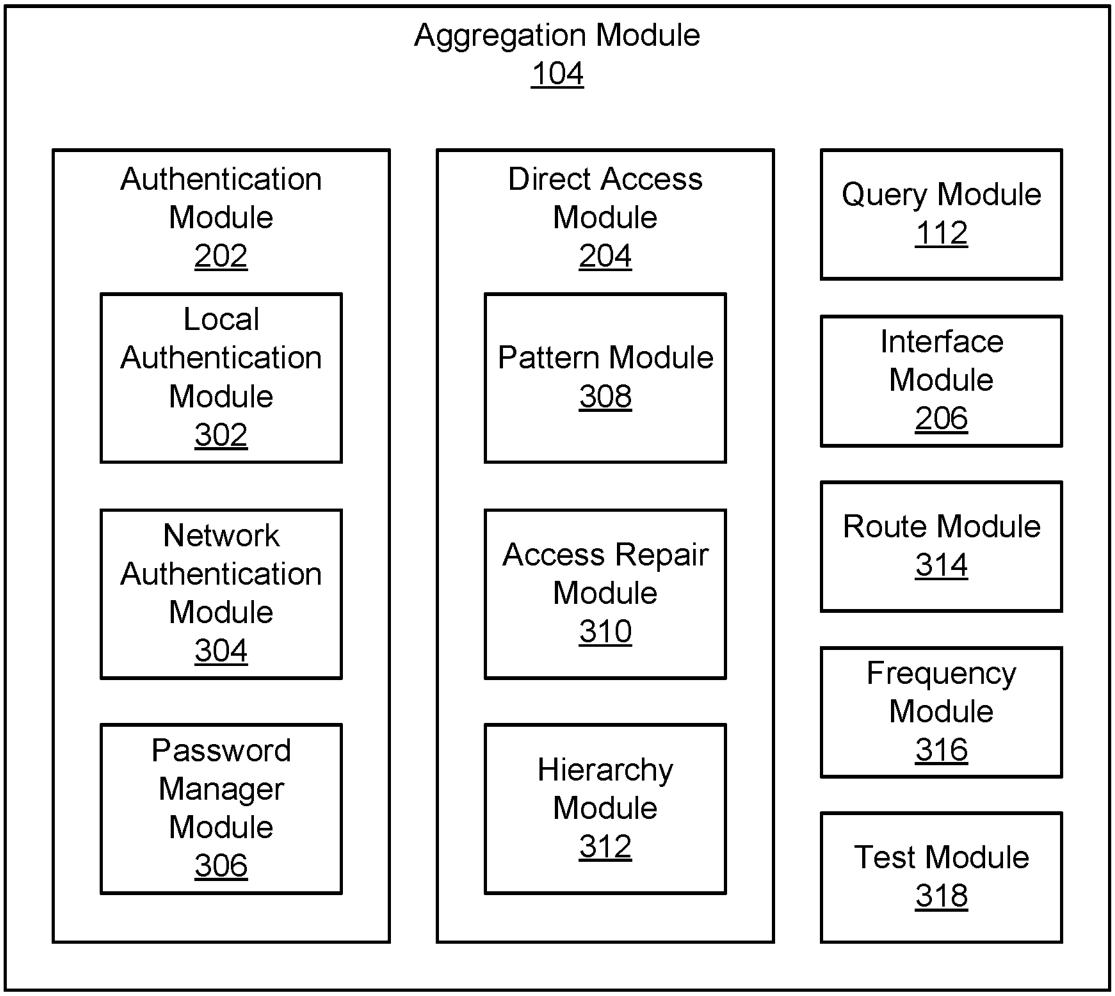
FIG. 3 is a schematic block diagram illustrating another embodiment of an aggregation module.

FIG. 3 depicts another embodiment of an aggregation module 104. In the depicted embodiment, the aggregation module 104 includes a query module 112, an authentication module 202, a direct access module 204, and an interface module 206 and further includes a route module 314, a frequency module 316, and a test module 318. The authentication module 202, in the depicted embodiment, includes a local authentication module 302, a network authentication module 304, and a password manager module 306. The direct access module 204, in the depicted embodiment, includes a pattern module 308, an access repair module 310, and a hierarchy module 312.

In one embodiment, the local authentication module 302 secures and/or authenticates the user's access to downloaded data, to stored passwords, and/or other data on a user's hardware device 102, transferred to and/or from a user's hardware device 102, or the like. For example, the local authentication module 302 may cooperate with one or more security and/or authentication systems of the user's hardware device 102, such as a PIN, password, fingerprint authentication, facial recognition, or other electronic credentials used by the user to gain access to the hardware device 102. In a further embodiment, the local authentication module 302 may authenticate a user before allowing the interface module 206 to provide the user access to downloaded/aggregated data and/or alerts or other messages. For example, the local authentication module 302 may manage and/or access electronic credentials associated with the aggregation module 104, for a user, and may authenticate the user in response to the user accessing an application and/or service of the aggregation module 104.

In certain embodiments, the local authentication module 302 may encrypt and/or otherwise secure, on a user's hardware device 102, electronic credentials and/or downloaded data associated with a different user, so that the user may not access data associated with the different user, but the different user may access the data once it is transmitted to a hardware device 102 of the different user, to a backend server 110, or the like. Local authentication modules 302 of different hardware devices 102, 110 may cooperate to securely transfer data (e.g., one or more electronic credentials, downloaded data, or the like) over the data network 106, from one hardware device 102, 110 to another hardware device 102, 110. In a further embodiment, the local authentication module 302 may ensure that a user's electronic credentials and/or downloaded data remain on a single hardware device 102 (e.g., are not transmitted on a data network 106), in a secure repository or the like, and are not stored on and/or accessible to a backend server 110, a hardware device 102 of another user, or the like.

In one embodiment, the network authentication module 304 receives and/or stores a user's electronic credentials for one or more third-party service providers 108 on a hardware device 102 of the user, on a backend server 110, or the like. The network authentication module 304, in various embodiments, may receive a user's electronic credentials from the user, from a hardware device 102 of the user, from a backend server 110, or the like. The network authentication module 304 may cooperate with the direct access module 204 to provide a user's electronic credentials to a server 108 of a third-party service provider 108 (e.g., the network authentication module 304 may provide electronic credentials to the direct access module 204 to provide to a server 108, the network authentication module 304 may provide electronic credentials directly to a server 108, or the like).

The network authentication module 304, in certain embodiments, may cooperate with the local authentication module 302 to encrypt and/or otherwise secure a user's electronic credentials for one or more third-party service providers 108, on a hardware device 102 of a user, on a data network 106, on a hardware device 102 of a different user, on a backend server 110, while being provided to a server 108 of a third-party service provider 108, or the like. In a further embodiment, the network authentication module 304 ensures that a user's electronic credentials are only stored on a user's hardware device 102 and sent from the user's hardware device 102 to a server 108 of a third-party service provider 108, and does not store a user's electronic credentials on a backend server 110, on a different user's hardware device 102, or the like. In another embodiment, the network authentication module 304 may securely store (e.g., using secure encryption) a user's electronic credentials for a third-party service provider 108 on a backend server 110, on a different user's hardware device 102, or the like, so that a direct access module 204 may access and/or download data associated with the user, even if the hardware device 102 of the user is unavailable, blocked, or the like, as described below with regard to the route module 314. In certain embodiments, whether the network authentication module 304 and/or the local authentication module 302 allow electronic credentials to be sent to and/or stored by a different user's hardware device 102, a backend server 110, or the like may be based on a setting defined based on user input, so that the user may decide a level of security, or the like.

In one embodiment, the password manager module 306 may manage and/or store electronic credentials of a user for a plurality of third-party service providers 108, so that the direct access module 204 may access and/or download data associated with the user from each of the plurality of third-party service providers 108. The password manager module 306, in certain embodiments, may generate and/or otherwise manage different, secure, credentials for each of a plurality of third-party service providers 108.

The password manager module 306, in one embodiment, may securely store generated credentials for a user on a hardware device 102 of the user, so that the user does not have to remember and enter the generated electronic credentials. For example, in addition to allowing a direct access module 204 to access a third-party service provider 108 using generated electronic credentials, the password manager module 306 may automatically populate one or more interface elements of a form on a webpage with electronic credentials (e.g., a username, a password) of the user, in response to the user visiting the web page in a web browser, or the like, without the user manually entering the electronic credentials. The password manager module 306, in certain embodiments, may periodically update (e.g., regenerate different credentials, such as a different password, and update the user's account with the third-party service provider 108 with the regenerated different credentials) electronic credentials for a user, such as every week, every month, every two months, every three months, every four months, every five months, every six months, every year, every two years, in response to a user request, in response to a request from a third-party service provider 108, and/or over another time period or in response to another periodic trigger.

The password manager module 306, in one embodiment, may synchronize a user's electronic credentials (e.g., provided by the user, generated by the password manager module 306, or the like) across different hardware devices 102, web browsers, or the like of a user. For example, in response to a password manager module 306 and/or the user updating or otherwise changing electronic credentials, the password manager module 306 may propagate the update/change to one or more other password manager modules 306, on different hardware devices 102 of the user, or the like.

In one embodiment, the pattern module 308 determines an ordered list (e.g., a pattern, a script, or the like) of multiple locations on one or more servers 108 of a third-party service provider 108 for the direct access module 204 to access the server (e.g., which may include locations other than where the data of the user is stored and/or accessible), one or more delays for the direct access module 204 to wait between accessing locations on the server 108, and/or other components of an access pattern for accessing data of a server. Locations, in certain embodiments, comprise independently addressable and/or accessible content and/or assets provided by one or more servers of a third-party service provider 108, or the like, such as webpages, portions of a webpage, images or other data files, databases or other data stores, pages or sections of a mobile application, or the like. The pattern module 308, in one embodiment, determines a pattern/ordered list that contains one or more locations and/or delays that are not necessary for the direct access module 204 to access or use in order to download desired data, but instead, the pattern/ordered list may make it difficult or impossible for the third-party service provider 108 to distinguish between the direct access module 204 accessing a server of the third-party service provider 108 and a user accessing the server of the third-party service provider.

The pattern module 308, in one embodiment, may determine and/or select the multiple locations and/or the one or more delays (e.g., a pattern/ordered list) based on an average pattern or a combined pattern identified in or based on behavior of multiple users accessing a third-party service provider 108 using a web browser, a mobile application, or the like. The pattern module 308, in one embodiment, may monitor one or more users (e.g., for a predetermined period of time or the like) as they access a server of a third-party service provider 108, tracking which links, data, webpages, and/or other locations the one or more users access, how long the one or more users access different locations, an order in which the one or more users access locations, or the like. In certain embodiments, the one or more monitored users may be volunteers, who have provided the pattern module 308 with authorization to temporarily or permanently monitor the users' access, in order to provide a more realistic access pattern for the direct access module 204 to use to access a server of a third-party service provider 108.

In a further embodiment, the pattern module 308 determines and/or selects multiple locations and/or one or more delays between accessing different locations based on a pattern identified in behavior of the user associated with the hardware device 102 on which the pattern module 308 is disposed, accessing the third-party service using a web browser, a mobile or desktop application, or other interface of the user's hardware device 102. For example, the pattern module 308 may comprise network hardware of the user's hardware device 102 (e.g., a network access card and/or chip, a processor, an FPGA, an ASIC, or the like in communication with the data network 106 to monitor data and/or interactions with a server of a third-party service provider 108), a web browser plugin or extension, a mobile and/or desktop application executing on a processor of the user's hardware device 102, or the like. The pattern module 308 may request and receive authorization from the user to monitor the user's activity with regard to one or more servers of one or more third-party service providers 108 from the user's hardware device 102.

The pattern module 308, in certain embodiments, may update a pattern/ordered list over time, based on detected changes in access patterns of one or more users or the like. In one embodiment, the pattern module 308 may coordinate and/or cooperate with the access repair module 310, described below, to update a pattern/ordered list in response to a server 108 of a third-party service provider 108 and/or data associated with a user becoming broken and/or inaccessible.

In one embodiment, the access repair module 310 detects that access to a server 108 of a third-party service 108 and/or data associated with a user is broken and/or becomes inaccessible. The access repair module 310, in certain embodiments, provides an interface to a user allowing the user to graphically identify an input location for the user's electronic credentials, a location of data associated with the user, or the like. For example, the access repair module 310 may provide a GUI, a command line interface (CLI), an API, and/or another interface allowing an end user to identify an input location for electronic credentials, an action for submitting electronic credentials, a location of data, or the like.

The access repair module 310, in one embodiment, provides an interface to a user on a hardware device 102 of the user.

In certain embodiments, for example, the access repair module 310 may overlay an interface over one or more pages of a website of a third-party service provider 108 on an electronic display screen of a user's hardware device 102. The access repair module 310 may provide one or more interfaces (e.g., GUIs, CLIs, APIs, overlays, or the like) to multiple users, allowing multiple users to define a repair and/or update for access to a server of a third-party service provider 108 (e.g., in a distributed and/or decentralized manner, from different hardware devices 102 or the like over a network 106).

The access repair module 310, in certain embodiments, may determine and/or display one or more suggestions 504 and/or recommendations 504 for the user, which the user may either confirm or change/correct (e.g., in a basic interface, a standard interface, a beginning user interface, or the like). For example, the access repair module 310 may display one or more interface elements with a suggested location for a user to enter a user name, a suggested location for a user to enter a password, a suggested credential submit action, a suggested location of data associated with the user, and/or one or more other interface elements allowing a user to graphically identify one or more locations within a website of a third-party service provider 108.

The access repair module 310, in certain embodiments, processes one or more pages of and/or other locations on a server 108 (e.g., one or more websites, web apps, or the like) to determine an estimate and/or prediction of an input location for a user's electronic credentials, an action for submitting a user's electronic credentials, a location of data associated with a user, or the like. In one embodiment, the access repair module 310 may estimate one or more locations and/or actions (e.g., by scanning and/or parsing one or more pages of a website, based on input from other users accessing one or more pages of a website, based on previous interactions of the user with one or more pages of a website, a prediction made using a machine learning and/or artificial intelligence analysis of a website, based on a statistical analysis of historical changes to one or more pages of a website and/or of one or more similar websites, or the like). The access repair module 310 may display to a user in an interface an estimate and/or prediction of an input location for the user's electronic credentials, a location of data associated with the user, or the like so that the user may confirm whether or not the estimate and/or prediction is correct using the interface.

The access repair module 310 may indicate one or more estimated locations and/or actions with an arrow or other pointer to a location; a link or other identifier of a location; a box or other highlighting around a location; by altering text labeling for a location to make the text bold, italic, and/or underlined; or the like. A user, in certain embodiments, may click, select, or otherwise identify a location to either confirm or change/correct a location suggested by the access repair module 310. For example, a user may click or otherwise select an interface element associated with a location and/or action and may click or otherwise select the location and/or perform the action, which the access repair module 310 may record (e.g., automatically populating a text field identifying the location and/or action, recording a macro allowing the action to be automatically repeated without the user, for a different user, or the like).

In certain embodiments, instead of or in addition to a standard, basic, or beginning user interface, the access repair module 310 may provide an advanced interface, for experienced users or the like, with source code of a website and/or other details of the website. For example, in one embodiment, an advanced access repair interface may allow one or more advanced users to identify one or more locations and/or actions within source code of a website, which may not be visible and/or readily apparent in the website itself. In certain embodiments, the access repair module 310 may provide a user interface element allowing a user to select and/or toggle between a standard user interface or view and an advanced user interface or view.

In one embodiment, the test module 318 cooperates with the access repair module 310 to verify whether or not one or more received locations and/or instructions from a user are accurate (e.g., usable to access data from a server of a third-party service provider 108). The test module 318, in certain embodiments, attempts to access a server 108 of a third-party service provider 108 for a plurality of different users (e.g., a sample group or test set), based on an identification the access repair module 310 received from a single user, using electronic credentials of the different users or the like.

The test module 318, in certain embodiments, determines whether data associated with the different users (e.g., a sample group or test set) is accessible using the identification from the single user. The test module 318 may repeatedly attempt to access data from a third-party service provider 108 using identifications which the access repair module 310 received from different users (e.g., on different hardware devices 102 and sent to the test module 318 on a single hardware device 102 over the data network 106, sent to multiple test modules 318 on different hardware devices 102 over the data network 106, sent to a test module 318 on a central backend server 110, or the like).

The test module 318, in one embodiment, provides one or more identifications from a user to other instances of the direct access module 204 (e.g., other test modules 318) for accessing a server 108 of a third-party service provider 108 in response to an amount of the different users (e.g., a sample group or test set) for which data is accessible using the identification from the single user satisfying a threshold. For example, if the identification from the single user successfully allows a predefined number of other test users (e.g., 2 users, 10 users, 100 users, 1000 users, 50% of test users, 75% of test users, and/or another predefined threshold number of test users) to access their data from a third-party service provider 108, the test module 318 may provide instructions based on the identification to more users (e.g., all or substantially all users, or the like).

In certain embodiments, the test module 318 may successively increase a test size comprising a number of users to which the test module 318 provides instructions for accessing their data from a third-party service provider 108 using an identification from a single user (e.g., starting with one or more test users, increasing to two or more, three or more, four or more, five or more, ten or more, twenty or more, thirty or more, forty or more, fifty or more, one hundred or more, five hundred or more, one thousand or more, five thousand or more, ten thousand or more, one hundred thousand or more, a million or more, and/or other successively increasing numbers of test users). The test module 318, in one embodiment, includes instructions based on an identification from a single user in an ordered list of multiple different sets of instructions for accessing a server 108 of a third-party service provider 108, as described in greater detail below with regard to the hierarchy module 312.

The test module 318, in certain embodiments, is configured to prioritize identifications from one or more users based on one or more trust factors for the one or more users (e.g., scores or the like). A trust factor, in one embodiment, may comprise a score or other metadata indicating a likelihood that a user's identification is correct. For example, in various embodiments, a trust factor may include and/or be based on one or more of a history of a user's previous identifications (e.g., correct or incorrect), a user's affiliation with a provider (e.g., a creator, a vendor, an owner, a seller, a reseller, a manufacturer, the backend server 110, or the like) of the one or more aggregation modules 104, positive and/or negative indicators (e.g., votes, likes, uses, feedback, stars, endorsements, or the like) from other users, and/or other indicators of whether or not a user's identification is likely to be correct. The test module 318 may determine how many other users to provide a user's identification based on one or more trust factors associated with the user (e.g., accelerating a rate at which a user's identification is provided to other users in response to a higher trust factor, decreasing a rate at which a user's identification is provided to other users in response to a lower trust factor, or the like).

The test module 318 may provide an override interface, allowing an administrator, moderator user, or the like to remove an identification, adjust and/or override an identification, adjust and/or override a trust factor for a user, ban a user from providing identifications, and/or otherwise override a user or a user's identification. In various embodiments, the test module 318 may provide an override interface to an administrator and/or moderator as a GUI, an API, a CLI, or the like.

In certain embodiments, the test module 318 causes the one or more aggregation modules 104 and their aggregation services to be self-healing, self-testing, and/or self incrementally deploying, as it tests and uses the most effective solutions, or the like (e.g., sets of instructions based on indications from one or more users).

In one embodiment, the hierarchy module 312 provides the direct access module 204 with an ordered list of multiple different sets of instructions for accessing a server 108 of a third-party service provider 108 using a user's electronic credentials, for downloading data associated with the user, or the like. Each different set of instructions, in certain embodiments, comprises a location for entering a user's electronic credentials, an instruction for submitting the user's electronic credentials, one or more locations of the data associated with the user, or the like.

The hierarchy module 312, in one embodiment, may receive one or more sets of instructions from a backend server 110 (e.g., a backend aggregation module **104*b* of a backend server 110), from another user hardware device 102 in a peer-to-peer manner (e.g., an aggregation module 104*a* of a user hardware device 102), from a test module 318, or the like. The hierarchy module 312, in certain embodiments, may receive multiple different sets of instructions already in an ordered list (e.g., a global hierarchical order) based on a history of successful and/or unsuccessful uses of the different sets of instructions by different user hardware devices 102 and/or users, or the like. In one embodiment, the hierarchy module 312 may determine a hierarchy for and/or create an ordered list from multiple different sets of instructions for a single user (e.g., a custom or individualized hierarchy) based on a history of successful and/or unsuccessful uses of the different sets of instructions by the user (e.g., from one or more hardware devices 102** of the user).

The direct access module 104, in one embodiment, may iterate through an ordered list of multiple sets of instructions for accessing a server 108 of a third-party service provider 108, in the order of the list, until one of the sets of instructions is successful and the direct access module 104 is able to access and/or download data from the third-party service provider 108. The hierarchy module 312, in one embodiment, may place a most recent successfully used set of instructions at the top (e.g., as the first set to try). For example, the hierarchy module 312 for a user's hardware device 102 may place a set of instructions for accessing a third-party service provider 108 at the top of a list (e.g., adjusting an order of the list over time) in response to the direct access module 204 successfully accessing and/or downloading data from the third-party service provider 108 using the set of instructions. In certain embodiments, the hierarchy module 312 may receive an ordered list of multiple different sets of instructions for accessing a server 108 of a third-party service provider 108 in a first order (e.g., a global order) and may dynamically adjust and/or rearrange the different sets of instructions over time based on a single user's/hardware device 102's use (e.g., moving a set of instructions up in the list if access using the set of instructions is successful for the user/hardware device 102, moving a set of instructions down in the list if access using the set of instructions is unsuccessful for the user/hardware device 102, or the like).

The hierarchy module 312, in certain embodiments, may be configured to share one or more sets of instructions, an ordered list of multiple sets of instructions, or the like with a hierarchy module 312 of another user's hardware device 102 over a data network 106 (e.g., directly to the other user's hardware device 102 in a peer-to-peer manner, indirectly by way of a backend aggregation module **104*b* of a backend server 110, or the like). Different sets of instructions may be successful or unsuccessful for different users, in various embodiments, due to different account types, different account settings, different originating systems (e.g., due to a corporate acquisition or the like, different users of the same third-party service provider 108 may have one or more different settings, different access methods, or the like), system changes or upgrades, and/or another difference in accounts, services, or the like for different users of the same third-party service provider 108**.

In one embodiment, the route module 314 determines whether a hardware device 102 of a user is available for the direct access module 204 to download data associated with the user from a server 108 of a third-party service provider 108. The route module 314, in certain embodiments, may access a server 108 of a third-party service provider 108, from a remote backend server 110, using the user's electronic credentials, to download data associated with the user from the server 108 to the remote backend server 110 in response to the route module 314 determining that the hardware device 102 of the user is unavailable. The route module 314, in one embodiment, provides a user one or more alerts (e.g., downloaded data from a third-party service provider 108, a recommendation or suggestion determined based on data from a third-party service provider 108, a notification or other alert based on an event or other trigger detected in data from a third-party service provider 108, or the like) on a hardware device 102 of the user based on the data associated with the user downloaded to the remote backend server 110.

In certain embodiments, the route module 314 maintains and/or stores a list of multiple hardware devices 102 associated with a single user and/or account. In response to determining that one hardware device 102 associated with a user and/or account is unavailable (e.g., powered down, in airplane mode, not connected to the data network 106, or the like), the route module 314 may access a server 108 of a third-party service provider 108 from a different, available hardware device 102 of the user and/or account, may provide one or more notifications or other alerts on a different, available hardware device 102, or the like. The route module 314, in various embodiments, may dynamically route downloading of data for a user from a third-party service provider 108 between multiple hardware devices, such as one or more hardware devices 102 of the user, one or more hardware devices 102 of a different user, one or more backend servers 110, and/or another hardware device, in a secure manner.

The route module 314, in one embodiment, may alternate or rotate between multiple hardware devices 102, 110 (e.g., of the same user, of different users, or the like) for downloading data for the same user from a third-party service provider 108 periodically. For example, rotating and/or alternating devices 102, 110 from which data is downloaded, may decrease a likelihood that the downloading will be misinterpreted as fraudulent or improper. In another embodiment, the route module 314 may download data from the same device 102, 110 (e.g., a primary hardware device 102 of a user, a backend server 110, or the like), which may be authorized and/or identified by the third-party service provider 108 as a trusted device, or the like.

In one embodiment, the frequency module 316 sets a frequency with which the direct access module 204 accesses the server 108 of a third-party service provider 108. The frequency module 316, in certain embodiments, determines a frequency based on input from a remote backend server 110, which may be unaffiliated with the third-party service provider 108 being accessed, so that the remote backend server 110 (e.g., the frequency module 316 executing on the remote backend server 110) determines frequencies for a plurality of direct access modules 204 for different users and/or different hardware devices 102. For example, the frequency module 316 may limit a single user and/or hardware device 102 from accessing the same third-party service provider 108 more than an allowed threshold number of times within a time period (e.g., once every ten minutes, once every half an hour, once every hour, twice a day, three times a day, four times a day, or the like). The frequency module 316, in certain embodiments, limits an access frequency to prevent inadvertent denial of service by a third-party service provider 108, or the like.

The frequency module 316, in certain embodiments, may dynamically adjust a frequency with which a user and/or hardware device 102 may access a third-party service provider 108 over time. For example, the frequency module 316 may monitor access and/or downloads by multiple users (e.g., all users, available users, active users, or the like) to cap or limit a total access and/or download bandwidth for each of the different third-party service providers 108 (e.g., so as not to overwhelm any single third-party service provider 108, or the like). In this manner, in one embodiment, a user and/or hardware device 102 may access and/or download data with a higher frequency when fewer other users and/or hardware devices 102 are accessing and/or downloading data (e.g., low peak times), but may be limited to a lower cap or access frequency when more other users and/or hardware devices 102 are accessing and/or downloading data (e.g., high peak times).

In a further embodiment, the frequency module 316 determines a frequency based on input from a user, allowing the user to set the access frequency independently of other users and/or of a backend server 110. The frequency module 316 may provide a user interface (e.g., a GUI, CLI, API, or the like) allowing a user to set and/or adjust an access frequency for downloading data from one or more third-party service providers 108 using one or more hardware devices 102 (e.g., providing different settings allowing the user to set different access frequencies for different third-party service providers 108, different hardware devices 102 of the user, or the like).

Figure 4:
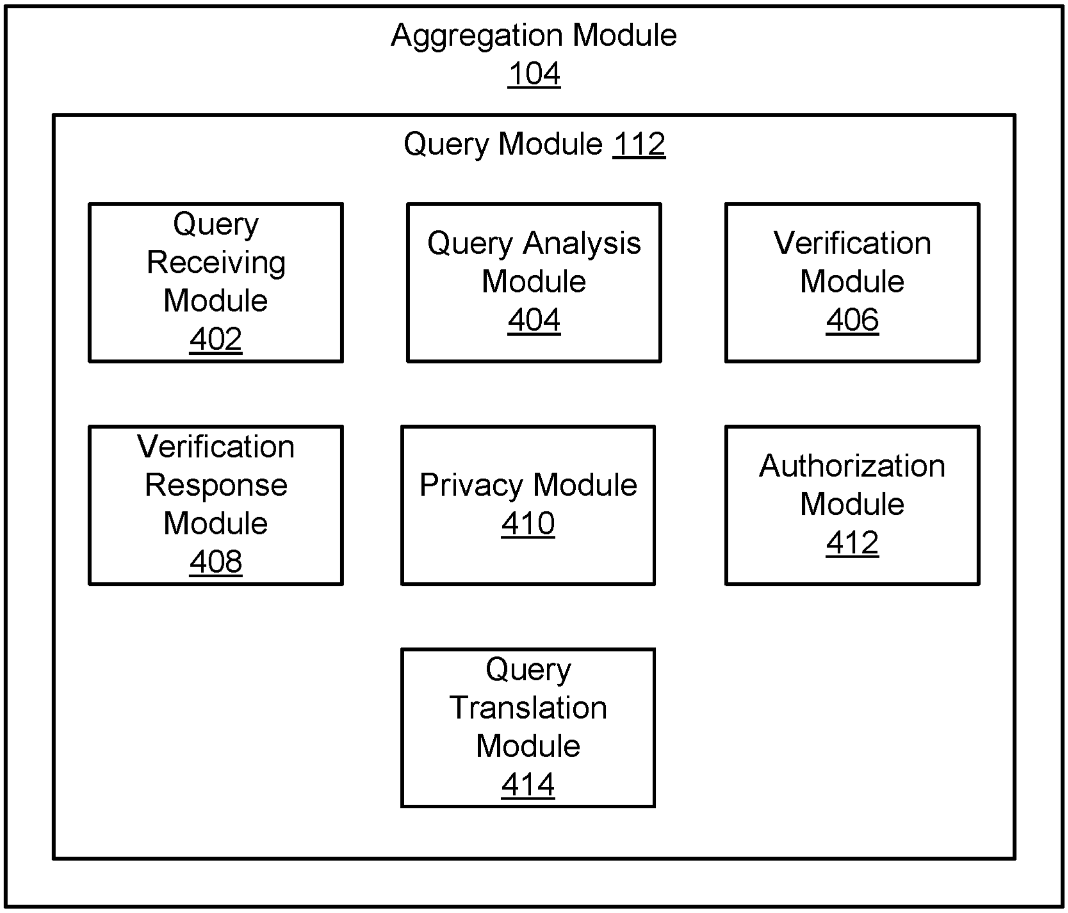
FIG. 4 is a schematic block diagram illustrating a further embodiment of an aggregation module.

FIG. 4 is a schematic block diagram illustrating one embodiment of an aggregation module 104 for a query interface. In one embodiment, the aggregation module 104 includes an instance of a query module 112. The query module 112, in various embodiments, includes one or more instances of a query receiving module 402, a query analysis module 404, a verification module 406, a verification response module 408, a privacy module 410, an authorization module 412, and a query translate module 414, which are described in more detail below.

In one embodiment, the query receiving module 402 is configured to receive a query from a user via a query interface. In another embodiment, the query receiving module 402 may be configured to receive a query from a third-party to verify sensitive data associated with a user. The query receiving module 402, in certain embodiments, provides a query interface for a user and/or a third-party to submit a query. The query receiving module 402, for instance, may provide a query interface as a web interface, an application programming interface (API), a command line interface (CLI), a graphical user interface (GUI) (e.g., locally through an application, remotely through a browser, or the like), a query language interface, a pass/fail interface (e.g., a Boolean interface or the like that either accepts/passes or rejects/fails an assertion or other submission), and/or another computer interface, locally on a computing device 102, 108, 110, over a data network 106, or the like. A user and/or a third-party 108 may submit one or more requests (e.g., an assertion, a query, or the like) to the query receiving module 402 using a query interface and may receive one or more responses from the verification response module 408, described below, over the query interface.

In certain embodiments, a query may be a natural language text string, a question, or the like. In another embodiment, a query may be intended to verify, confirm, validate, or the like sensitive information associated with a user, such as identity information, financial information, employment information, health information, and/or other personal or sensitive information. For example, a third-party service provider 108, such as a financial institution, an employer, a government agency, an educational institution, a lender, and/or another third-party may have reason to verify one or more aspects of a user's financial state, financial data, identity, or the like, and the user may desire to preserve their privacy. The query receiving module 402, in one embodiment, may provide a query interface that at least partially preserves the user's privacy while securely validating one or more queries and/or assertions submitted by a third-party 108 and authorized by the user as it relates to the user's sensitive information.

In one embodiment, the query analysis module 404 is configured to analyze the query to identify one or more results for a query. In certain embodiments, the query analysis module 404 supports multiple types of requests (e.g., from a user, from a third-party to verify and/or query different assertions, different data, or the like).

For example, the query analysis module 404 may support search requests from a user, artificial intelligence prompts from a user, requests to verify and/or query an identity of a user, a financial account balance (e.g., a current balance, an available balance, a statement balance, a previous day posted balance, a total balance, an outstanding loan balance, a past balance for a particular time frame/range, or the like), a financial account type, a financial account status, an account interest rate, an original loan amount, a loan type, a loan term, a maturity date for a loan, a last payment amount, a last payment date, a minimum payment amount, a past due amount, a next payment amount, an autopay status, a payoff amount, an escrow balance, interest earned, taxes paid or due (e.g. property taxes, income taxes, payroll taxes, or the like), a payment history of a user, a transaction type/category, a transaction amount, a transaction date, a transaction status, a merchant name, a merchant address, a check amount, a check number, a fee amount, a fee date, an investment amount, an investment description, an investment type, an average cost basis for an investment, a number of shares for an investment, an investment market value, an investment type, verification of membership of a financial institution for a user, insurance premium payments paid and/or due, or the like.

The query analysis module 404 may identify a type of a request, in various embodiments, by a command type (e.g., different commands for different types of request), by a request identifier (e.g., sent as an argument of a request or the like), by a user selection in a GUI, or the like. In certain embodiments, the query analysis module 404 may analyze the aggregated transaction data using machine learning to determine a type of the request, sensitive information that a third-party wants to verify, or the like. The analysis module 404 may use various machine learning functions, methods, processes, algorithms, or the like for predicting, forecasting, projecting, estimating, or the like a type of the query, a user that is the subject of the query, or the like.

The machine learning functions may include both supervised learning (example inputs and their desired outputs are provided with the goal to learn a general rule that maps inputs to outputs) and unsupervised learning (no labels are given to the learning algorithm, leaving it on its own to find structure in its input) algorithms. Examples of different machine learning algorithms may include decision tree learning, association rule learning, deep learning, inductive logic programming, support vector machines, clustering, Bayesian networks, representation learning, genetic algorithms, rule-based learning, deep learning, or the like. The machine learning functions may be part of an artificial neural network where one or more machine learning algorithms may work together to process the aggregated transaction data. Furthermore, the query analysis module 404 may create machine learning ensembles (e.g., a set of multiple different machine learning algorithms) that process the query.

In one embodiment, the query analysis module 404 may provide previous queries, example queries, training queries, or the like to one or more machine learning algorithms for training and/or inference. Once the machine learning is trained (e.g., a machine learning model is generated and trained on training queries) the query analysis module 404 may provide more recent queries, queries in real-time, or the like to the machine learning to process the query to identify, predict, or the like a type of the query, a type of a user's sensitive data to verify, or the like. In this manner, the query analysis module 404 may generate up-to-date and accurate machine learning results for a submitted query in real-time.

In one embodiment, a query includes an identifier for a user, which the query analysis module 404 identifies by parsing the query using natural language processing, regular expressions, machine learning, or the like. In certain embodiments, an identifier is used to access the user's sensitive data related to the type of sensitive data to verify. The user identifier may include a name, username, email address, token, digital certificate, social media name, account number, or the like.

In one embodiment, the verification module 406 is configured to run a query against a user's data (e.g., the user's aggregated data). The verification module 406, for instance, may login to at least one account for the user at a third-party system (e.g., a data aggregator system, a financial system, a social media platform, or the like) using previously-stored electronic credentials for the user. The previously-stored electronic credentials may include a username/password, a PIN, a passphrase, an answer to a challenge question, biometric information (e.g., a fingerprint scan, a facial recognition scan, or the like), a wireless signature, a token (e.g., a digital or electronic token that is generated in response to successfully logging into the third party using other credentials and is used to access the user's data thereafter), or the like.

In one embodiment, the verification module 406 is configured to access the user's aggregated data and run the query against the data to determine a query result to be embedded in a display of additional and/or public query results. The verification module 406 may run a query directly, may translate a submitted query into a query language, or the like, against the user's data to generate a results data set, which the verification response module 408 may use to return a response for the query.

The verification response module 408, in one embodiment, is configured to generate a response to a query based on a user's aggregated data. For example, the verification module 406 may analyze the user's aggregated data and return a list, total, sum, or the like of the user's financial transactions associated with a received query. The verification response module 408, based on aggregated data for a user that the verification module 406 returns, determines a response to a query, or the like.

The privacy module 410, in one embodiment, is configured to receive and/or set customized privacy settings for accessing a user's aggregated data. The privacy settings may be received and set for a user via the query interface, through an API, a web interface, application settings, a command line interface, or the like. As used herein, privacy settings may define who can access the user's data, which of the user's data can be accessed, or the like.

A user may specify privacy settings that include at least one of user accounts that queries are allowed to run on, transaction types (e.g., purchases, loan payments, account balances, or the like) that queries are allowed to run on, third-parties that are authorized to submit queries and/or blocked from submitting queries, types of queries that are allowed to be run, transaction amount limits that queries can be run on, date ranges of the user data that can be queried, a size of a range that can be queried; one or more thresholds that are allowed to be used with regard to the user's data in responding to requests, a number of times that the data can be queried, personal information that is allowed to be queried (e.g., name, address, email, location, age, or the like), social media data (e.g., tweets, posts, likes, friends, or the like), employment information, tax information, insurance information, health information, other commands, or the like. In some embodiments, the user can set privacy settings on a per-account basis (e.g., different settings for different user accounts), a per-third-party submitting the query basis (e.g., different settings for different third-parties), or the like.

In one embodiment, the authorization module 412 is configured to prompt a user for authorization to process a query in response to receiving a query (e.g., from the user, from a third-party, or the like). In response to a query being submitted via a query interface, the authorization module 412 may send, present, display, or the like a prompt, notification, message, or the like to the user for the user to authorize or deny the query's use of aggregated data associated with the user. For example, the authorization module 412 may send a user an email, a push notification, a text message, an instant message, a social media message, a request for authentication through an authenticator application, or the like. A user may establish authentication settings as part of the privacy settings that the privacy module 410 establishes. A user, for instance, may choose whether to be notified of a query submission, whether to require authorization prior to submitting a query, a manner in which to be notified, or the like.

In one embodiment, the query translation module 414 is configured to translate the received query into a query language that is used to access a data store for the user's aggregated data. A query, in some embodiments, may be received in a native language such as English, Spanish, French, or the like. The query translation module 414, which may be part of or in communication with the query analysis module 404, may analyze a query using natural language processing, machine learning, or the like to determine a type of the query (e.g., financial transaction data for a merchant, an account balance, a spending history, or the like) and translate the query to a query language that is used to query a data store where the user's data is stored, such as Structured Query Language (SQL), extensible markup language (XML), or the like.

Figure 5:
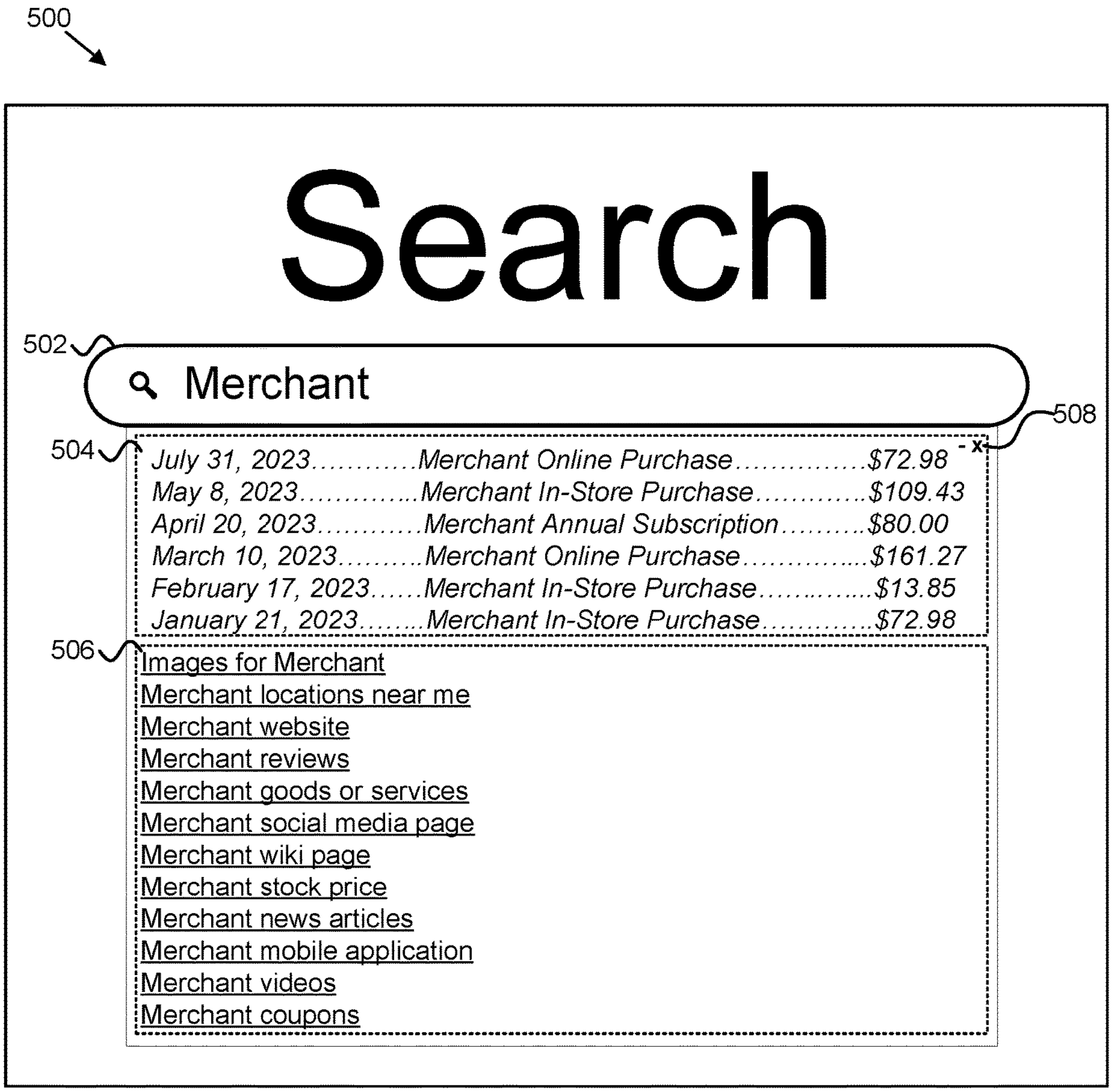
FIG. 5 is a schematic block diagram illustrating one embodiment of a graphical user interface.

FIG. 5 depicts one embodiment of a graphical user interface 500. In the depicted embodiment, the graphical user interface 500 includes a publicly accessible query interface 502, embedded financial transaction data 504, query results 506, and one or more user interface elements 508.

In one embodiment, the query interface 502 may comprise a publicly accessible query interface 502, such as a search engine, an artificial intelligence query interface, or the like. In some embodiments, "publicly accessible" may mean that a query interface 502 is available online (e.g., on the internet, on a data network 106, or the like), is accepting new users and/or accounts, or the like. A publicly accessible query interface 502, in certain embodiments, may require an account and/or user authentication.

In one embodiment, the financial transaction data 504 comprises one or more financial transactions, account balances, and/or other financial information accessed by a query module 112 from a financial account of a user with a third-party service provider 108, or the like. For example, a query module 112 may authenticate a user for a third-party financial account of the user with a third-party service provider 108, for example, using electronic credentials such as a username/password, a PIN, a passphrase, an answer to a challenge question, biometric information (e.g., a fingerprint scan, a facial recognition scan, or the like), a wireless signature, a token (e.g., a digital or electronic token that is generated in response to successfully logging into the third party using other credentials and is used to access the user's data thereafter), or the like.

In one embodiment, the one or more user interface elements 508 are configured to allow a user to toggle (e.g., alternately hide and display) the financial transaction data 504. For example, in some embodiments, a query module 112 may hide and/or minimize display of one or more financial transactions 504 in response to a first user interaction with a user interface element 508 (e.g., a click, a touch, and/or another interaction) and may display and/or redisplay the one or more financial transactions 504 in response to a second user interaction with a user interface element 508 (e.g., a click, a touch, and/or another interaction). In a further embodiment, a query module 112 may display multiple user interface elements 508 which perform different operations (e.g., a minimize and/or maximize user interface element 508 that temporarily hides and/or reveals the financial transaction data 504; a close user interface element 508 that closes and/or hides the financial transaction data 504 until a user changes a setting, submits another query, or the like; and/or another user interface element 508).

In one embodiment, the query results 506 may comprise internet search results associated with a query received from a user via the query interface 502. The one or more financial transactions 504, in certain embodiments, are also associated with the same query as the query results 506. For example, in the depicted embodiment, a user has searched for a specific "merchant" and a query module 112 displays one or more of the user's financial transactions 504 with the merchant (e.g., transaction dates, transaction descriptions, transaction amounts, or the like) as well as query results 506 associated with the same merchant (e.g., images for the merchant, locations of the merchant, a website for the merchant, reviews of the merchant, good and/or services of the merchant, a social media page for the merchant, a wiki page for the merchant, a stock price of the merchant, news articles associated with the merchant, a mobile application for the merchant, videos associated with the merchant, coupons and/or offers for the merchant, or the like).

Figure 6:
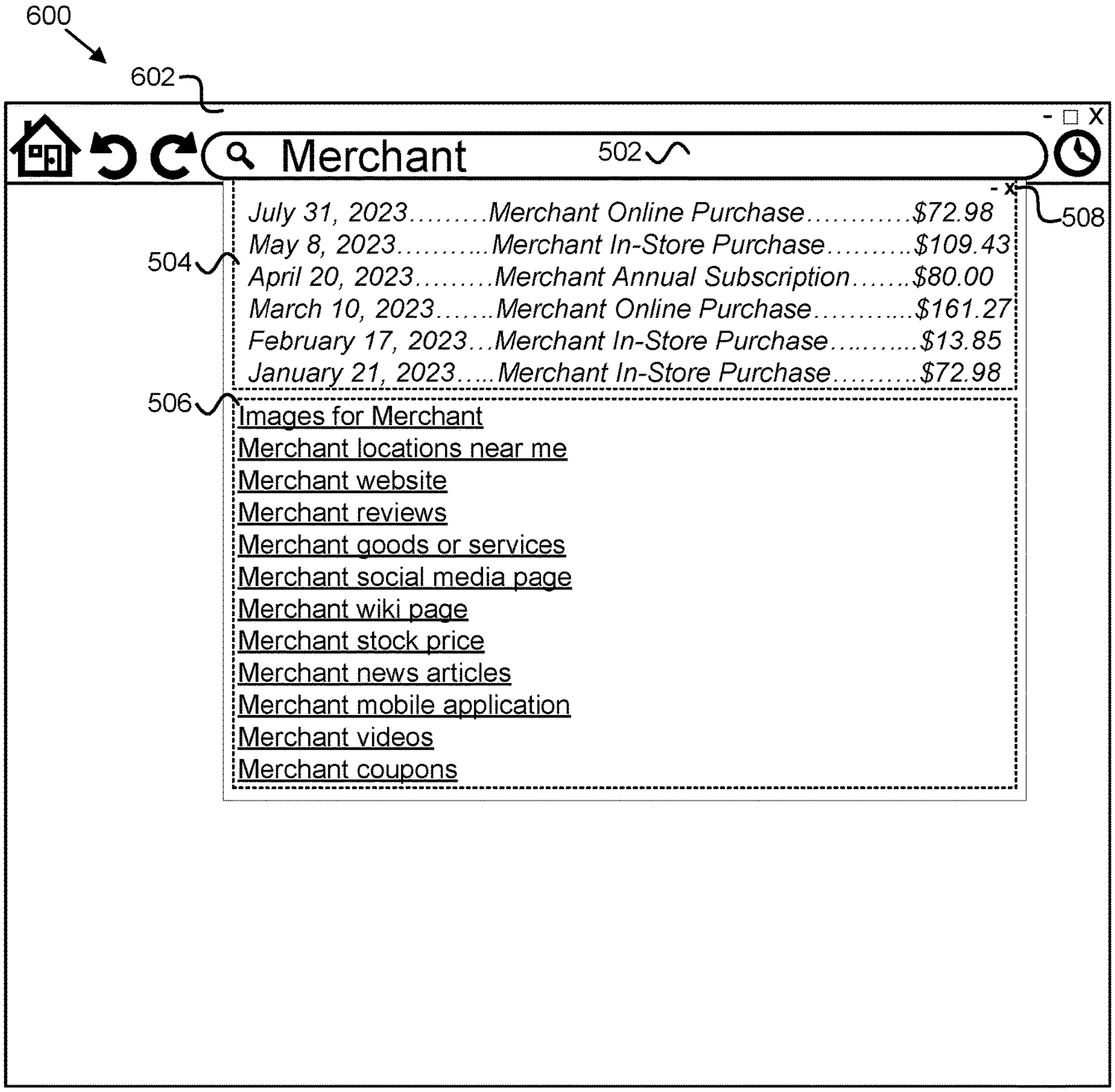
FIG. 6 is a schematic block diagram illustrating a further embodiment of a graphical user interface.

FIG. 6 depicts one embodiment of a graphical user interface 600. In some embodiments, the graphical user interface 600 may be substantially similar to the graphical user interface 500 described above with regard to FIG. 5, with a publicly accessible query interface 502, embedded financial transaction data 504, query results 506, and/or one or more user interface elements 508.

The graphical user interface 600, in the depicted embodiment, is embedded within an internet browser window 602, with the query interface 502 comprising a URL and/or search box of the internet browser. In one embodiment, a query module 112 may dynamically embed a display of one or more financial transactions 504 into a display of query results 506, in response to a user entering a query into the query interface 502, or the like. In certain embodiments, a query module 112 may display one or more financial transactions 504 and/or query results 506 in the internet browser window 602 dynamically, without displaying a web page of a search engine and/or artificial intelligence query interface (e.g., until a user presses "enter"/"return", clicks on a user interface element, or the like).

Figure 7:
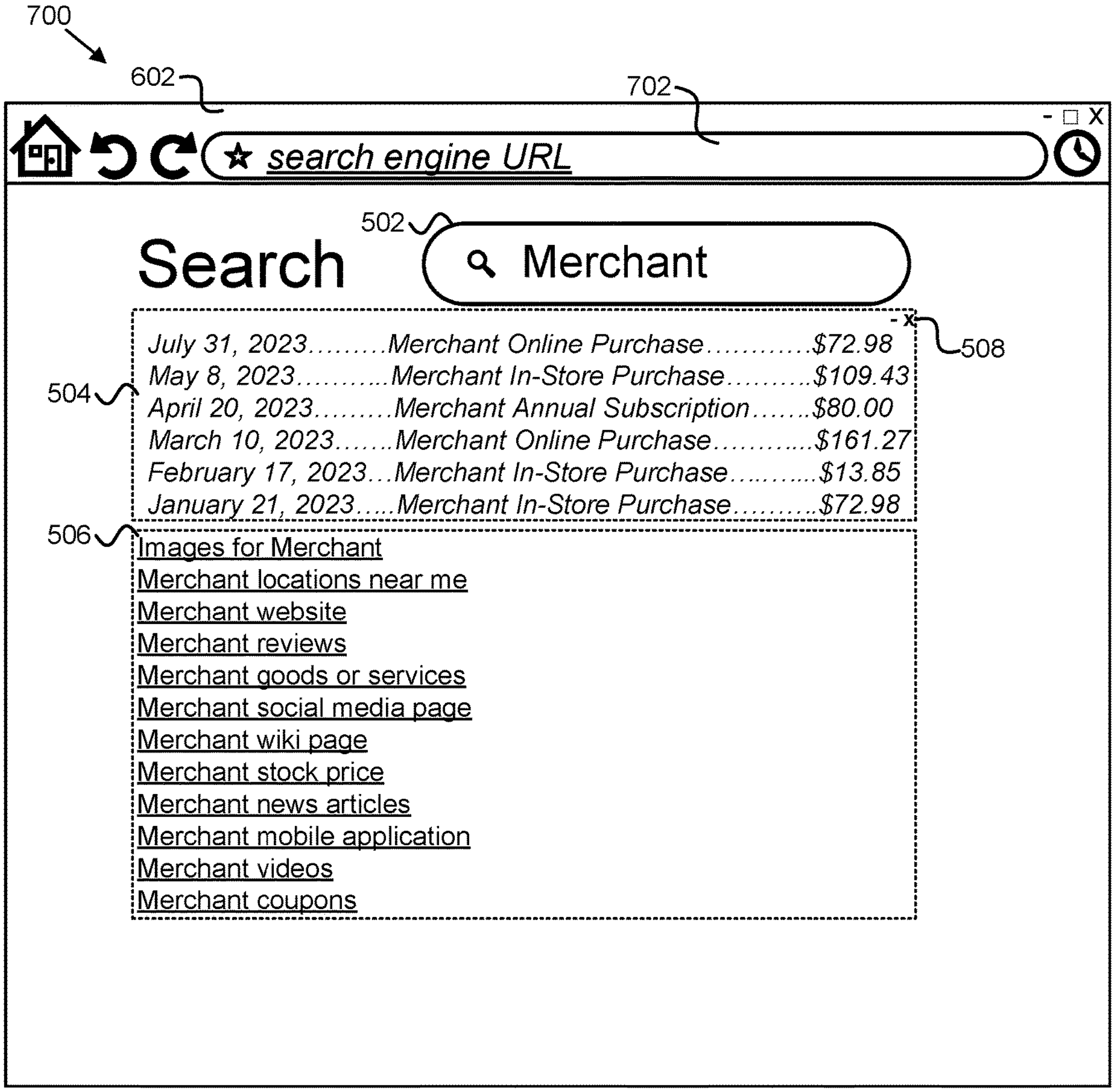
FIG. 7 is a schematic block diagram illustrating a certain embodiment of a graphical user interface.

FIG. 7 depicts one embodiment of a graphical user interface 700. In some embodiments, the graphical user interface 700 may be substantially similar to the graphical user interface 500 described above with regard to FIG. 5 and/or the graphical user interface 600 described above with regard to FIG. 6, with a publicly accessible query interface 502, embedded financial transaction data 504, query results 506, and/or one or more user interface elements 508, within an internet browser window 602 or the like In the depicted embodiment, the graphical user interface 700 comprises a web page 702 of a search engine and/or an artificial intelligence query interface, and the web page 702 comprises the query interface 502, the embedded financial transaction data 504, the query results 506, and/or the one or more user interface elements 508. For example, a user may enter a URL or other identifier of the web page 702 into a URL and/or search box 704 of the internet browser window 602 and the internet browser window 602 may download and/or display the web page 702, with the query interface 502, the embedded financial transaction data 504, the query results 506, and/or the one or more user interface elements 508 (e.g., some of which may be loaded in response to the user entering a search and/or query into the query interface 502, or the like).

Figure 8:
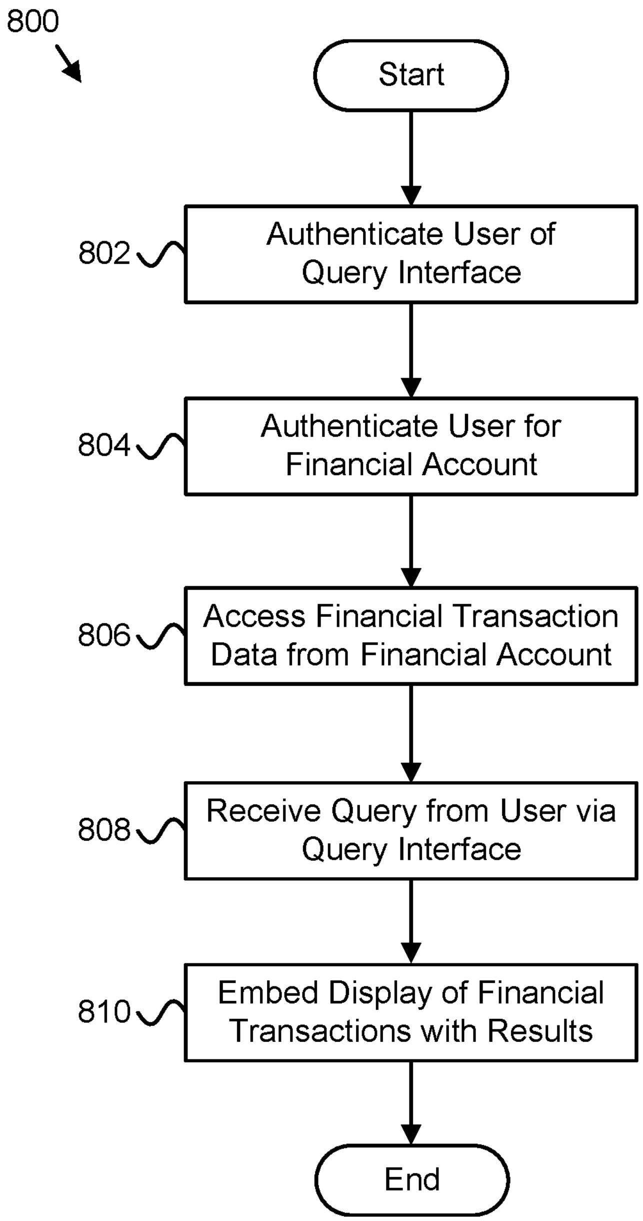
FIG. 8 is a schematic flow chart diagram illustrating one embodiment of a method for an aggregated data query interface.

FIG. 8 depicts one embodiment of a method 800 for an aggregated data query interface. The method 800 begins, and a query module 112 authenticates 802 a user of a publicly accessible query interface 502. A query module 112 authenticates 804 the user for a third-party financial account 108 of the user. A query module 112 accesses 806 financial transaction data 504 from the third-party financial account 108 on behalf of the user. A query module 112 receives 808 a query from the user via the publicly accessible query interface 503. A query module 112 embeds 810, in a graphical user interface 500, 600, 700 on an electronic display screen 102, a display of one or more financial transactions 504 from the financial transaction data 504 from the third-party financial account 108 with a display of query results 506 from the publicly accessible query interface 502, the one or more financial transactions 504 and the query results 506 each associated with the query from the user, and the method 800 ends.

Figure 9:
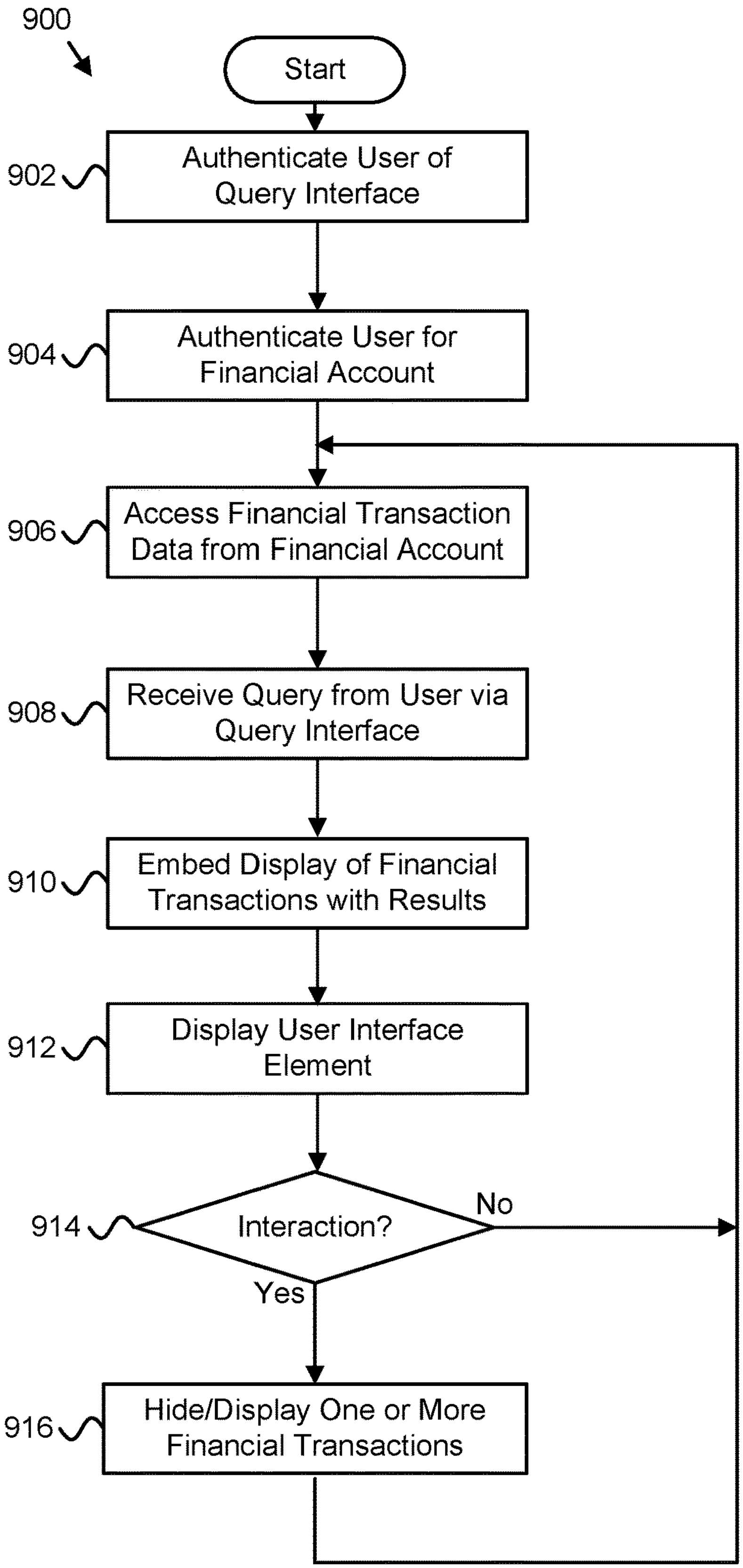
FIG. 9 is a schematic flow chart diagram illustrating a further embodiment of a method for an aggregated data query interface.

FIG. 9 depicts one embodiment of a method 900 for an aggregated data query interface. The method 900 begins, and a query module 112 authenticates 902 a user of a publicly accessible query interface 502. A query module 112 authenticates 904 the user for a third-party financial account 108 of the user. A query module 112 accesses 906 financial transaction data 504 from the third-party financial account 108 on behalf of the user. A query module 112 receives 908 a query from the user via the publicly accessible query interface 503. A query module 112 embeds 910, in a graphical user interface 500, 600, 700 on an electronic display screen 102, a display of one or more financial transactions 504 from the financial transaction data 504 from the third-party financial account 108 with a display of query results 506 from the publicly accessible query interface 502, the one or more financial transactions 504 and the query results 506 each associated with the query from the user.

A query module 112 displays 912 a user interface element 508 associated with the display of the one or more financial transactions 504. A query module 112 determines 914 whether or not a user interacts with the user interface element 508. In response to detecting 914 a first interaction with the user interface element 508, a query module 112 hides 916 the display of the one or more financial transactions 504. In response to detecting 914 a second interaction with the user interface element 508, a query module 112 displays 916 the one or more financial transactions 504. The method 900 continues, accessing 906 financial transaction data 504 for a user and monitoring 908 the query interface 502 for additional queries.

A means for authenticating a user of a publicly accessible query interface 502, in various embodiments, may include one or more of a hardware device 102, a backend server 110, an authentication module 202, a local authentication module 302, a network authentication module 304, a password manager module 306, an aggregation module 104, a query module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for authenticating a user of a publicly accessible query interface 502.

A means for authenticating a user for a third-party financial account 108 of the user, in various embodiments, may include one or more of a hardware device 102, a backend server 110, an authentication module 202, a local authentication module 302, a network authentication module 304, a password manager module 306, an aggregation module 104, a query module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for authenticating a user for a third-party financial account 108 of the user.

A means for accessing financial transaction data 504 from a third-party financial account 108 on behalf of a user, in various embodiments, may include one or more of a hardware device 102, a backend server 110, a direct access module 204, a pattern module 308, an access repair module 310, a hierarchy module 312, an aggregation module 104, a query module 112, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for accessing financial transaction data 504 from a third-party financial account 108 on behalf of a user.

A means for receiving a query from a user via a publicly accessible query interface 502, in various embodiments, may include one or more of a hardware device 102, a backend server 110, a query receiving module 402, a query module 112, an aggregation module 104, a query module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, a data network 106, an HDMI or other electronic display dongle, a hardware appliance or other hardware device, other logic hardware, and/or other executable code stored on a computer readable storage medium. Other embodiments may include similar or equivalent means for receiving a query from a user via a publicly accessible query interface 502.

A means for embedding, in a graphical user interface 500, 600, 700 on an electronic display screen 102, a display of one or more financial transactions 504, in various embodiments, may include one or more of a hardware device 102, an electronic display screen of a hardware device 102, a backend server 110, an interface module 206, an aggregation module 104, a query module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for embedding, in a graphical user interface 500, 600, 700 on an electronic display screen 102, a display of one or more financial transactions 504.

A means for hiding display 504 of the one or more financial transactions in response to a first user interaction with a user interface element 508, in various embodiments, may include one or more of a hardware device 102, an electronic display screen of a hardware device 102, a backend server 110, an interface module 206, an aggregation module 104, a query module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for hiding display 504 of the one or more financial transactions in response to a first user interaction with a user interface element 508.

A means for displaying one or more financial transactions 504 in response to a second user interaction with a user interface element 508, in various embodiments, may include one or more of a hardware device 102, an electronic display screen of a hardware device 102, a backend server 110, an interface module 206, an aggregation module 104, a query module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for displaying one or more financial transactions 504 in response to a second user interaction with a user interface element 508.

Means for performing the other operations and/or method steps described herein, in various embodiments, may include one or more of a hardware device 102, a backend server 110, an authentication module 202, a local authentication module 302, a network authentication module 304, a password manager module 306, a direct access module 204, a pattern module 308, an access repair module 310, a hierarchy module 312, an interface module 206, a route module 314, a frequency module 316, a test module 318, a query receiving module 402, a query analysis module 404, a verification module 406, a verification response module 408, a privacy module 410, an authorization module 412, a query translation module 414, a query module 112, an aggregation module 104, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for performing one or more of the operations and/or method steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus, comprising:

a processor; and a memory that stores code, when executed by the processor, causes the processor to perform operations, the operations comprising:

authenticating a user of a publicly accessible query interface, the publicly accessible query interface being a query interface that is available to general members of the public and is independent of and unaffiliated with a third-party financial account of the user;

authenticating the user for a third-party financial account of the user, the third-party financial account being separate from and unaffiliated with the publicly accessible query interface;

accessing financial transaction data from the third-party financial account on behalf of the user;

receiving a query from the user via the publicly accessible query interface; and embedding, in a graphical user interface on an electronic display screen, a display of one or more financial transactions from the financial transaction data from the third-party financial account with a display of query results from the publicly accessible query interface, the one or more financial transactions and the query results each associated with the query from the user, the financial transactions and the query results each being responsive to the same query and displayed together in a single graphical user interface.

2. The apparatus of claim 1, wherein the publicly accessible query interface comprises an internet search engine.

3. The apparatus of claim 2, wherein the publicly accessible query interface comprises a search box for the internet search engine, the search box disposed within a user interface of an internet browser.

4. The apparatus of claim 1, wherein the publicly accessible query interface comprises an artificial intelligence query interface.

5. The apparatus of claim 4, wherein the artificial intelligence query interface bases the query results at least partially on the financial transaction data from the third-party financial account.

6. The apparatus of claim 1, the operations further comprising:

displaying a user interface element associated with the display of the one or more financial transactions;

hiding display of the one or more financial transactions in response to a first user interaction with the user interface element; and displaying the one or more financial transactions in response to a second user interaction with the user interface element.

7. The apparatus of claim 1, wherein the query identifies a merchant and the one or more financial transactions are between the user and the identified merchant.

8. A computer program product comprising executable code stored on a non-transitory computer readable storage medium, the executable code, when executed by a processor, causes the processor to perform operations, the operations comprising:

authenticating a user of a publicly accessible query interface, the publicly accessible query interface being a query interface that is available to general members of the public and is independent of and unaffiliated with a third-party financial account of the user;

authenticating the user for a third-party financial account of the user, the third-party financial account being separate from and unaffiliated with the publicly accessible query interface;

accessing financial transaction data from the third-party financial account on behalf of the user;

receiving a query from the user via the publicly accessible query interface;

embedding, in a graphical user interface on an electronic display screen, a display of one or more financial transactions from the financial transaction data from the third-party financial account with a display of query results from the publicly accessible query interface, the one or more financial transactions and the query results each associated with the query from the user, the financial transactions and the query results each being responsive to the same query and displayed together in a single graphical user interface.

9. The computer program product of claim 8, wherein the publicly accessible query interface comprises an internet search engine.

10. The computer program product of claim 9, wherein the publicly accessible query interface comprises a search box for the internet search engine, the search box disposed within a user interface of an internet browser.

11. The computer program product of claim 8, wherein the publicly accessible query interface comprises an artificial intelligence query interface.

12. The computer program product of claim 11, wherein the artificial intelligence query interface bases the query results at least partially on the financial transaction data from the third-party financial account.

13. The computer program product of claim 8, the operations further comprising:

displaying a user interface element associated with the display of the one or more financial transactions;

hiding display of the one or more financial transactions in response to a first user interaction with the user interface element; and displaying the one or more financial transactions in response to a second user interaction with the user interface element.

14. The computer program product of claim 8, wherein the query identifies a merchant and the one or more financial transactions are between the user and the identified merchant.

15. An apparatus, comprising:

means for authenticating a user of a publicly accessible query interface, the publicly accessible query interface being a query interface that is available to general members of the public and is independent of and unaffiliated with a third-party financial account of the user;

means for authenticating the user for a third-party financial account of the user, the third-party financial account being separate from and unaffiliated with the publicly accessible query interface;

means for accessing financial transaction data from the third-party financial account on behalf of the user;

means for receiving a query from the user via the publicly accessible query interface;

means for embedding, in a graphical user interface on an electronic display screen, a display of one or more financial transactions from the financial transaction data from the third-party financial account with a display of query results from the publicly accessible query interface, the one or more financial transactions and the query results each associated with the query from the user, the financial transactions and the query results each being responsive to the same query and displayed together in a single graphical user interface.

16. The apparatus of claim 15, wherein the publicly accessible query interface comprises an internet search engine.

17. The apparatus of claim 16, wherein the publicly accessible query interface comprises a search box for the internet search engine, the search box disposed within a user interface of an internet browser.

18. The apparatus of claim 15, wherein the publicly accessible query interface comprises an artificial intelligence query interface that bases the query results at least partially on the financial transaction data from the third-party financial account.

19. The apparatus of claim 15, further comprising:

means for hiding display of the one or more financial transactions in response to a first user interaction with a user interface element; and means for displaying the one or more financial transactions in response to a second user interaction with the user interface element.

20. The apparatus of claim 15, wherein the query identifies a merchant and the one or more financial transactions are between the user and the identified merchant.

* * * * *